United States Patent [19]

Fromme

[11] Patent Number: 5,075,847
[45] Date of Patent: Dec. 24, 1991

[54] METHOD AND APPARATUS FOR COMPUTER PROGRAM ENCAPSULATION

[75] Inventor: Brian D. Fromme, Fort Collins, Colo.

[73] Assignee: Hewlett-Packard Company, Palo Alto, Calif.

[21] Appl. No.: 358,962

[22] Filed: May 26, 1989

[51] Int. Cl.$^5$ ............................................. G06F 12/00
[52] U.S. Cl. ................................. 395/700; 364/280.4; 364/286; 364/280.1; 364/DIG. 1
[58] Field of Search ................ 364/280.4, 280.1, 286

[56] References Cited

U.S. PATENT DOCUMENTS

| | | |
|---|---|---|
| 4,536,840 | 8/1985 | Borta . |
| 4,809,170 | 2/1989 | LeBlang et al. ............... 364/200 |
| 4,949,253 | 8/1990 | Chigira et al. ............... 364/286 |

OTHER PUBLICATIONS

Invention Disclosure Letter written to inventor Brian Fromme from attorney Chris Byrne, Two pages, 7/10/89.
Responsive Letter to above from inventor Brian Fromme, (Three pages).
"Tooltool User's Guide," Version 2.0, Chuck Musciano, Advanced Technology Department, Harris Corporation.
"UIMX Developer's Guide", Incomplete Draft, Hewlett-Packard Part No. 00000-00000, Apr. 1989, Chapter 13 is most pertinent Primary Examiner—Salvatore Cangialosi
Attorney, Agent, or Firm—Karl E. Bring

[57] ABSTRACT

A method and apparatus for encapsulating an application tool into a computer-aided software development system that includes a number of standard software development tools. The application tool is integrated into the software development system without modification of its code. An interface description file that defines desired operations in responding to predefined events received from the development tools and from a user interface is complied to generate a symbol table and a statement table. The symbol table and the statement table are evaluated to generate objects which define operations that are performed when responding to the predefined events. An event handler responds to the predefined events received from the development tools and from the user interface by evaluating objects corresponding to the predefined events and executing the operations defined therein. Notifications received from the development tools can be utilized to trigger predefined operations by the application tool. A subprocess controller permits the application tool to be run locally or on a remote host computer.

40 Claims, 12 Drawing Sheets

SYMBOL TABLE

| NAME | TYPE | VALUE | FUNCTION |
|---|---|---|---|
| make_object | — | — | pointer to code |
| e | event | pointer to event data structure | — |
| a | attribute | pointer to attribute data structure | — |
| start | — | — | pointer to code |

FIG 7

STATEMENT TABLE

| TAG | LHS | RHS |
|---|---|---|
| = | *e | pointer to event data structure |
| = | *a | pointer to attribute data structure |
| call | *make_object | pointer to object parameter list |
| call | *start | — |

FIG 8

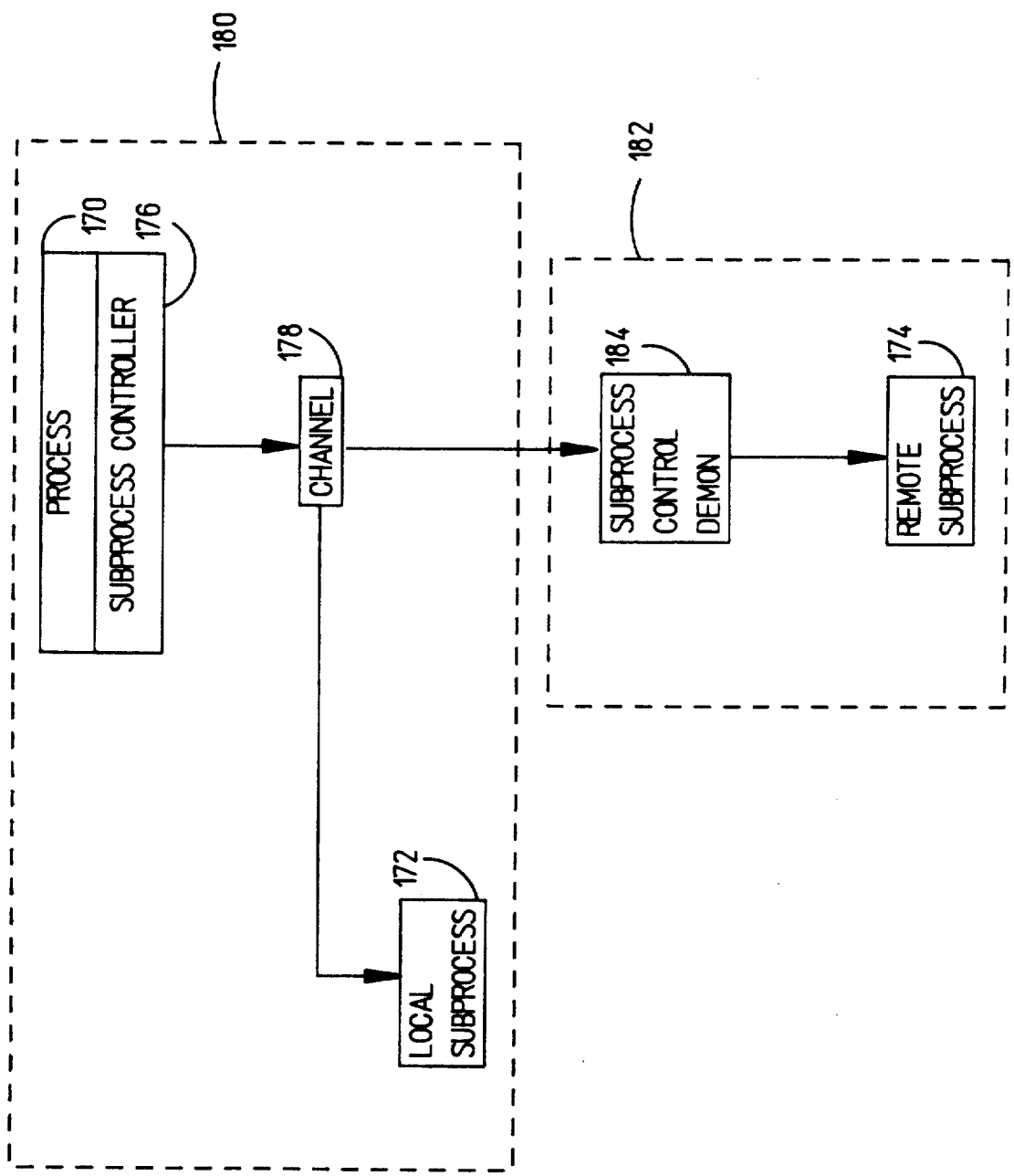

METHOD AND APPARATUS FOR COMPUTER PROGRAM ENCAPSULATION

CROSS-REFERENCE TO RELATED APPLICATIONS

The following applications are related to the present application: "Shared Libraries Implemented With Linking Program Loader", Ser. No. 07/359,829, filed June 1, 1989; "Method and Apparatus for Controlling Execution of Tools in A Computer-Aided Software Engineering System", Ser. No. 07/359,912, filed June 1, 1989; "Method and Apparatus for Communication Between Tools in A Computer-Aided Software Engineering System", Ser. No. 07/359,309, filed May 31, 1989; and "Method and Apparatus For Software Branch Analysis", application Ser. No. 07/154,684, filed Feb. 10, 1988 now U.S. Pat. No. 4,914,659.

FIELD OF THE INVENTION

This invention relates to methods and apparatus for computer-aided software engineering and, more particularly, to methods and apparatus for incorporating application programs into an integrated computer-aided software development system.

BACKGROUND OF THE INVENTION

Computer-aided software engineering (CASE) systems have been developed to assist computer programmers in the construction, test and maintenance of complex computer software. Such systems assist the programmer in building or compiling the program and in analyzing the program both statically and dynamically. Modern CASE systems are intended to operate in an environment where teams of programmers work on the development of a complex program. In many instances, CASE systems operate with a window-based user interface.

CASE systems typically involve a number of different tools, or programs, designed to assist in program development. Such tools typically include a program edit tool, a build tool, a debug tool and a version management tool. The tools may be integrated or developed to cooperate over a problem domain to further facilitate automation of software development tasks. CASE systems typically utilize the UNIX operating system or modifications of the UNIX operating system. (UNIX is a registered trademark of AT&T in the U.S.A. and other countries.) Software can be developed on CASE systems efficiently without requiring programmers to have a detailed knowledge of the development tools or the underlying operating system.

One drawback of prior art CASE systems has been the inability to customize the system for particular applications. It is not uncommon for programmers in a particular industry or technical field to rely upon specialized programs, or development tools, because of the nature of the programs which they are developing. For example, programmers working with engineering design programs may rely on one or more specialized development tools, while programmers working with telecommunication programs may rely on an entirely different set of specialized development tools. Such tools may include, for example, UNIX system tools that are not frequently used or tools that are specially developed for a particular application. It would be desirable for CASE systems to have the capability to utilize such specialized development tools, so that programmers could take advantage of the automation and efficiency provided by the CASE system as well as the desirable features of the specialized tools.

In the past, it has been difficult or impossible to integrate specialized development tools into a CASE system. When only the binary code for the tool is available, integration has not been feasible. When source code is available, the integration of the tool into the CASE system requires the tool to be reengineered, often requiring several person-months of programming effort. Thus, prior art CASE systems have been difficult to customize for particular applications.

It is a general object of the present invention to provide methods and apparatus for incorporating and utilizing an application tool in a computer-aided software development system.

It is another object of the present invention to provide methods and apparatus for incorporating an application tool into a computer-aided software development system utilizing only the binary code of the application tool.

It is a further object of the present invention to provide methods and apparatus for incorporating an application tool into a computer-aided software development system which permit communication between the application tool and other tools which comprise the software development system.

It is a further object of the present invention to provide methods and apparatus for incorporating an application tool into a computer-aided software development system wherein other tools in the software development system can trigger actions by the application tool.

It is yet another object of the present invention to provide methods and apparatus for incorporating an application tool into a computer-aided software development system such that the application tool is provided with a user interface that is compatible with the software development system.

It is a further object of the present invention to provide methods and apparatus for incorporating an application tool into a computer-aided software development system without reengineering the application tool.

It is still another object of the present invention to provide methods and apparatus for incorporating an application tool into a computer-aided software development system such that the application tool can be run on a local host computer or a remote host computer.

SUMMARY OF THE INVENTION

According to the present invention, these and other objects and advantages are achieved in a method for encapsulating an application tool into a computer-aided software development system that includes a user interface, an operating system and one or more integrated software development tools for performing predefined tasks. The method comprises the steps of converting an interface description file that defines desired operations in responding to predefined events received from the development tools and from the user interface into a set of data structures representing the desired operations, responding to the predefined events received from the development tools and from the user interface by evaluating portions of the data structures corresponding to the predefined events and executing the operations defined therein, and requesting action by the application tool when required by the portions of the data structures.

The step of converting an interface description file typically includes the step of compiling the interface description file to generate a symbol table defining the symbols in the interface description file and a statement table defining the operations in the interface description file. The step of converting the interface description file typically further includes the step of evaluating the symbol table and the statement table to generate objects containing events defining operations which can be performed when responding to the predefined events.

Events are received from the user interface, the development tools, the application tool and the operating system. Objects contain specified operations to be performed for each event received. In responding to the predefined events, one or more operations contained in the object corresponding to the received event is evaluated and executed. A received event is matched against stored event patterns in the corresponding object in order to identify an operation corresponding to the received event.

In requesting action by the application tool, a subprocess controller permits communication with the application tool either on the local host computer or on a remote host computer through a network. The subprocess controller determines whether the application tool is to be executed locally or on a remote host computer. When the application tool is to be executed locally, a request is forwarded directly to the application tool. When the application tool is to be executed on a remote host computer, a request is forwarded to the remote host computer.

The method for program encapsulation in accordance with the present invention permits an application tool to be integrated into the computer-aided software development system without access to the binary code of the application tool and without reengineering the application tool. The application tool is provided with a user interface that is compatible with the user interface of the software development system. In addition, the application tool can send and receive requests for action to and from the other development tools in the system. In addition, application tool operations can be triggered automatically by events occurring in the system without intervention by the user.

In order to encapsulate an application tool into the software development system, the interface description file, which defines desired operations in responding to predefined events, is prepared using an interface description language The interface description file is compiled and interpreted to provide a set of data structures which define the operations. Control is then transferred to an event handler which receives events from the user interface, the development tools, the application tool and the operating system. The responses to the events are determined by referencing the corresponding data structures and executing the operations contained in the data structures.

According to another aspect of the invention, there is provided apparatus for encapsulating an application tool into a computer-aided software development system as described above.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 7 illustrates an example of a symbol table utilized by the encapsulation system;

FIG. 8 illustrates an example of a statement table utilized by the encapsulation system;

FIG. 11 is a block diagram illustrating the structure of the subprocess controller;

DETAILED DESCRIPTION OF THE INVENTION

Figure 1:
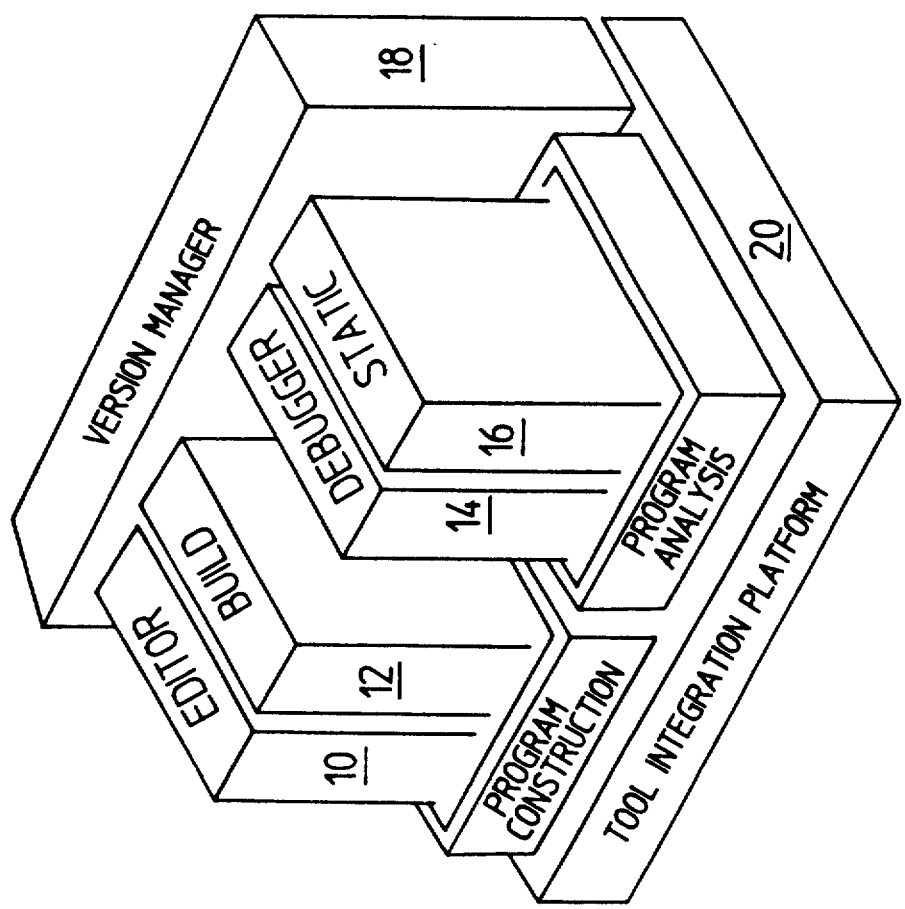
FIG. 1 is a pictorial representation of the architecture of a computer-aided software engineering system.

A pictorial representation of the a computer-aided software engineering system is shown in FIG. 1. The system includes a set of program development tools, including an edit tool 10, a build tool 12, a debug tool 14, a static analyzer tool 16 and a version manager tool 18. The term "tool" is used herein to denote software routines or programs for performing a predefined function or set of functions. As described hereinafter, the tools are integrated to provide a complete CASE system. The edit tool 10 and the build tool 12 are associated with program construction, while the debug tool 14 and the static analyzer tool 16 are associated with program analysis and testing. The tools 10, 12, 14, 16 and 18 are controlled and integrated by an operating system known as a tool integration platform 20. The tool integration platform 20 performs the functions of communication between tools, work area management, distributed tool execution, user interface management and, as described in detail hereinafter, encapsulation of custom application tools.

One of the most common operations on a file is to edit it. The edit tool 10 is a mouse and menu-based source file editor. The primary function of the build tool 12 is compiling. The build tool 12 invokes the compiler and steps the user through any compile-time or link-time errors encountered. When the program build is complete, the system is instructed to start the debug tool 14 on the executable code. The debug tool 14 provides multi-window source level symbolic debugging. The user can execute the specified program in a controlled environment to examine the dynamic behavior, and data structures can be examined or monitored. In order to gain an understanding of the status aspects of the program, the user can invoke the static analyzer tool 16. The static analyzer tool 16 answers questions regarding call structures, type definitions and scoping. The version manager tool 18 provides access/change control, retention of previous program versions and retrieval of programs by revision number, date, symbolic name and/or release date. The details of the program development tools 10, 12, 14 16 and 18 are outside the scope of the present invention and will not be described further. It will be understood that different tools can be substituted into or added to the CASE system shown in FIG. 1. For example, different debug tools can be utilized depending on the type of program being developed.

The tool integration platform 20 includes a message server which provides an effective means for communication between tools as described in more detail hereinafter. With regard to work area management, the user can specify a work area. A work area is a collection of files that make up the project the user is working on. For example, the user can start up the static analyzer tool 16 by simply specifying a work area. Then the analyzer will determine the appropriate files to analyze. The tool integration platform 20 supports distributed tool execution. Tools executing on several machines communicate and interact exactly as if they were all executing on a single processor. The tool integration platform 20 manages the user interface, which is highly graphical and window-based, interactive and task-oriented.

An important feature of the CASE system is that it supports program development by multiple users in a distributed computing environment. Thus, tools can be run on a local host computer or a remote host computer, and files can be accessed in remote systems. However, the distributed nature of the process is transparent to the user. The CASE system described herein can be run on a Series 300 or a Series 800 workstation manufactured by Hewlett-Packard Company. Typical hardware requirements on either workstation include 8 or 16 megabytes RAM, a high resolution display, keyboard and mouse, and a 150 or 300 megabyte disk. The CASE system is run with the HP-UX operating system, a UNIX-based operating system, and X11 Windows, a system for support of window-based operation. However, the present invention is not limited to use with the above hardware and software, and can be utilized with any suitable general purpose computer.

Figure 2:
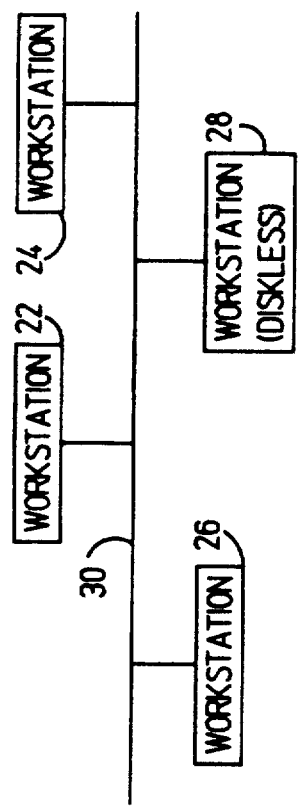
FIG. 2 is a block diagram of a distributed computing system on which the CASE system can be run.

As indicated above, the CASE system supports a multi-workstation environment A typical system configuration is shown in FIG. 2. Workstations 22, 24, 26 and 28 are interconnected on a network 30. The workstations 22, 24 and 26 are configured as described above, while workstation 28 does not include a disk storage unit. The workstations can each access resources in other workstations. The workstation 28 utilizes the disk in one of the other workstations. Any number of workstations can be utilized in a distributed system of the type shown in FIG. 2.

Figure 3:
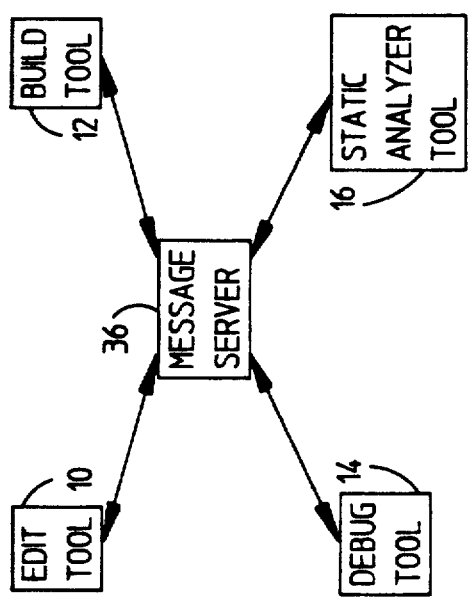
FIG. 3 is a block diagram illustrating the communication interface to a tool in the CASE system.

In order to understand program encapsulation in accordance with the present invention, it is necessary to define communication within the CASE system. As described above, the CASE system includes a plurality of program development tools supported by a tool integration platform 20. Communication with a tool such as the build tool 12 is illustrated in FIG. 3. The tool 12 receives user requests and provides user responses via a user interface 32. In the window-based CASE system of the present invention, the user communicates through an X-Window system 34. (The X-Window System is a trademark of MIT.) Thus, for example, when the user selects an option via a mouse click or enters information via the keyboard, that information passes through the X-Window system 34 to the tool 12. Additional information regarding the X-Window system is available in *X Toolkit Intrinsics, X Window System, X Version 11, Release 2*, 1985. The tool 12 communicates with the operating system via system signals 33.

Important aspects of the programming environment from the users perspective are how well the individual tools communicate and cooperate with each other and whether the environment appears tool-oriented or task-oriented. In most prior art programming environments, tool cooperation was achieved by the user orchestrating even the simplest tool interactions. The CASE system described herein improves programmer productivity by providing facilities for tools to request actions by other tools rather than requiring user intervention.

Figure 4:
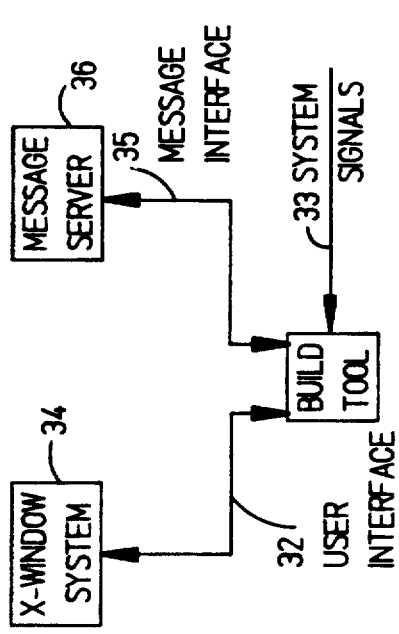
FIG. 4 is a block diagram illustrating communication between tools in the CASE system.

All communication with other tools takes place through a message interface 35 and a message server 36 as shown in FIGS. 3 and 4. A tool requests action by one or more other tools by sending a request to the message server 36. The message server 36 then forwards the request to the appropriate tool or tools. The tool that executes the request is known as a server. After completion of the requested action, a success or failure notification is sent by the server to the message server 36. The notification is forwarded by the message server 36 to the requesting tool and to any other tools that wish to receive it.

The message server 36 determines, in accordance with predefined patterns, the tools to which each message is forwarded. Frequently, a request or a notification is forwarded to several tools. Communication between tools through message server 36 is thus driven by events occurring in each of the tools. Typically, there is a set of messages which all tools are required to service and a set of messages which are particular to a class of tools.

The following is an example of communication between tools. When any tool in the CASE system modifies a file, it sends out a FILE MODIFIED notification. Any other tool which is displaying the referenced file is then informed that its view of the file is out of date. The new version of the file can be automatically reloaded, or the user can be notified that his view of the file is out of date.

Another example of the event-driven communication described above starts with the user saving a source file in the edit tool 10. The edit tool 10 sends a notification message to the message server 36 stating that a file has been saved and supplying the file path. The message server 36 then forwards the message to the version manager tool 18. The version manager tool 18 checks the new version of the file into version control so that the current state can be recovered. It then sends a notification saying that the file has been saved. The message server 36 receives the notification and forwards this information to both the build tool 12 and the static analyzer 16. The build tool 12 starts a compile of the new source file, and the static analyzer tool 16 updates its database with the new source file.

Messages are typically passed as strings. Messages have the form: originator, request_ID, message type, tool class, operation, context [arguments]. The originator field indicates the tool that sent the message. The request_ID field is a unique ID hat is composed of message_number, process_ID, and host. By providing a unique ID, responses can be associated with their original requests. The message type field includes request message, success notification, or failure notification. The tool class is the type of tool to which the message is being sent (edit, debug, etc.). The operation is the command being sent (save, file, step, stop, etc.). The context field includes host, base directory and file information which indicates the location of the data upon which the operation is to be performed. Each message may have arguments which provide additional information. Further information regarding communication between tools in the CASE system is provided in the aforementioned application entitled "Method and Apparatus for Controlling Execution of Tools in A Computer-Aided Software Engineering System".

An important feature of the CASE architecture described above is the use of triggers. Triggers are cause-/effect relationships which can link arbitrary combinations of CASE tools. Triggers activate on system or user events and can cause system or user-defined actions to occur. These actions may include sending messages to other tools or running arbitrary commands or routines. As described hereinafter, triggers are particularly useful in connection with encapsulated application tools. Triggers associated with the encapsulated application tool can be defined by the user.

Examples of triggers include:

1. Cause mail to be sent to management and/or team whenever a program release is made.
2. Cause mail to be sent to team whenever the system successfully builds a program.
3. Cause compiles to occur when files are checked into version control.
4. Cause compiles to occur at a specific time.
5. Cause tape archive of released programs.
6. Cause control flow information to be gathered whenever a successful build occurs.
7. Cause a program listing to be printed whenever a successful build occurs.
8. Cause files to be written to disk whenever checked into version control.
9. Cause a program release to be compressed and archived whenever a release is made.
10. Cause performance data to be displayed after a program is run.
11. Cause debugger to reload whenever a build is successful.
12. Cause metrics to be collected whenever a file is saved in editor.

While the CASE system includes the basic tools needed for program development, particular industries or particular technical fields may require the use of tools not included in the basic system. These tools may include readily available tools that are not included in the CASE system because of infrequent use, and tools which have been developed by the user for a particular purpose. It is desirable to integrate such specialized application tools into the CASE system so that they can be utilized. Full integration usually requires that the user interface to the application tool be made compatible with the user interface of the CASE system and usually requires that the application tool be capable of communication with other tools in the system. In cases where only the binary executable code of the application tool is available to the user, such integration has not previously been possible. Even when the source code of the application tool is available, integration requires the application tool to be reengineered, often requiring several person-months of effort.

In accordance with the present invention, there is provided a method for encapsulating an application tool and fully integrating it into the CASE system. The method of the present invention requires only the binary executable code of the application tool and does not require modification of its code. Integration of an application tool in accordance with the present invention can usually be accomplished with far less effort than would be required to reengineer the application tool for integration into the CASE system, even if the source code is available.

Figure 5:
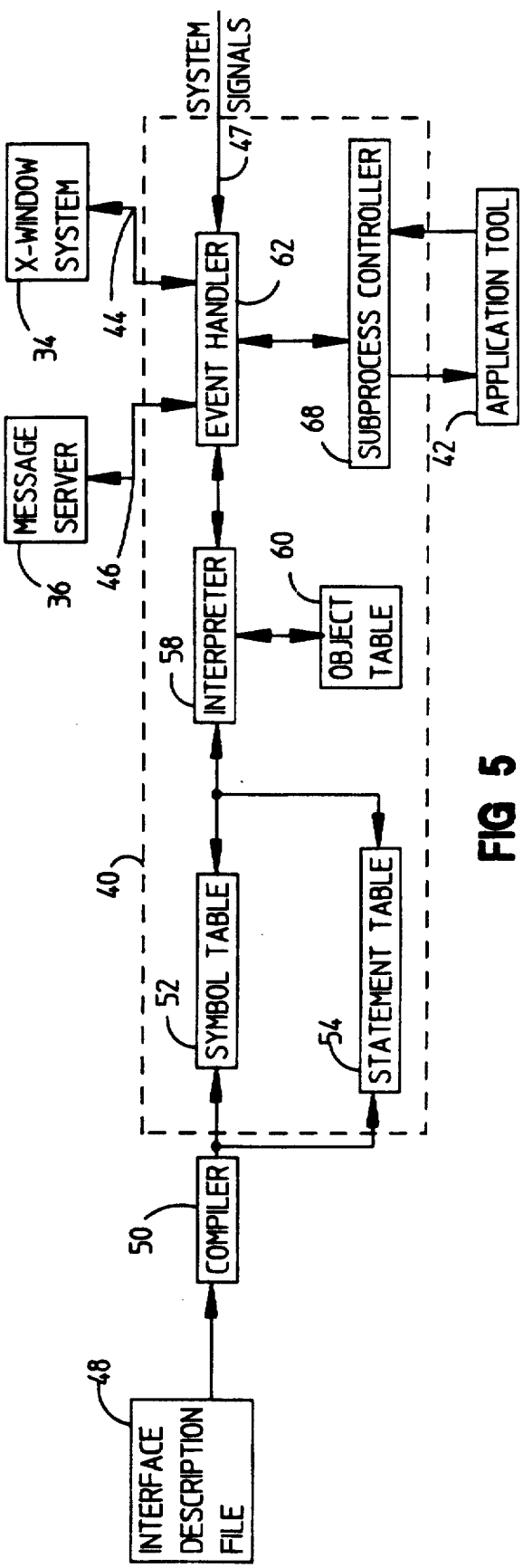
FIG. 5 is a block diagram illustrating the encapsulation system of the present invention.

The present invention provides a method for easily integrating application tools into the CASE system. The process of integrating an application tool into the CASE system is known as encapsulation, and the program for performing the encapsulation is known as an encapsulator or encapsulation system. Referring to FIG. 5, the encapsulator includes a run-time interface program 40 which sends inputs to an application tool 42 and receives outputs from the application tool 42. The interface program 40 communicates with the CASE system in the same manner as a standard tool of the CASE system. Thus the interface program 40 communicates with the X-Window system 34 via a user interface 44, communicates with message server 36 via a message interface 46 and communicates with the operating system via system signals 47.

Since different application tools 42 may be encapsulated by different users, the interface program 40 is different in each case. Furthermore, even for the same application tool 42, different users may require a different user interface or different messages to and from other tools in the CASE system. In accordance with the present invention, the interface program 40 is easily generated utilizing an interface description language (IDL). The interface description language permits the user to define communication with the application tool and with other tools and to define the user interface to the application tool. The interface description language is used to develop an interface description file (IDF) 48 specific to a particular application tool. The IDF defines all operations and data structures utilized by the interface program.

The application tools selected for encapsulation in accordance with the present invention must conform to the UNIX pipe model of communication. Communication with the application tool is in the form of character string inputs and character string outputs. There are over 500 standard UNIX tools which are suitable for encapsulation. In addition, users have developed specialized tools based on the UNIX pipe model which are also suitable for encapsulation. Additional information regarding the UNIX system is available in *Introducing UNIX System V*, Rachel Morgan et al, McGraw Hill, 1987.

Figure 5A:
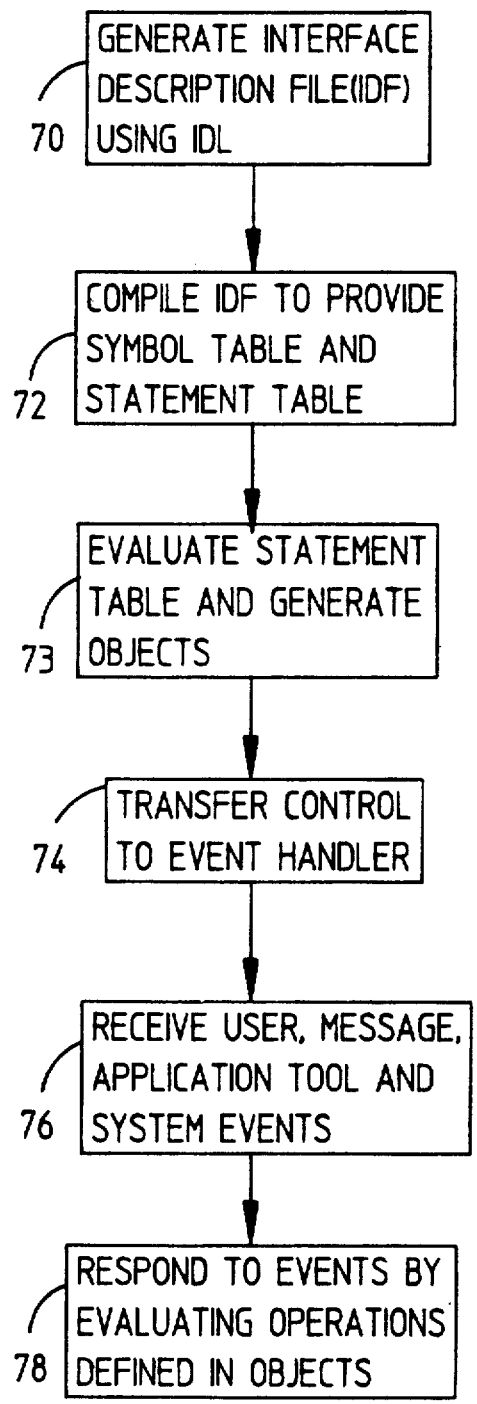
FIG. 5A is a top level flow diagram of the method for encapsulating an application program into the CASE system.

The main program flow of the encapsulation system is illustrated in FIG. 5A. Initially, the interface description file s generated by the user in step 70. The interface description file 48 is compiled by a specialized compiler 50 in step 72 to produce an intermediate level code comprising a symbol table 52 and a statement table 54 (FIG. 5). Then, an interpreter 58 evaluates the intermediate level code and generates an object table 60 in step 73. Control is then transferred to an event handler 62 in step 74. The event handler 62 controls run-time operation. The event handler 62 receives input events from the user interface, the message server, the application tool and the operating system in step 76.

The event handler 62 receives input events from the user and provides output to the user through X-Window system 34. The event handler 62 also communicates with other tools in the CASE system via message events sent to and received from the message server 36. Furthermore, system events from the operating system are sent to the event handler 62 in the form of system signals. Communication with the encapsulated application tool 42 occurs through a subprocess controller 68. As described hereinafter, the subprocess controller 68 permits the application tool 42 to be run on the local host computer or on a remote host computer without intervention by the user. The event handler 62 responds to user events, message events, system events and application events in step 78 by calling upon the interpreter 58 to execute functions defined in the object table 60, as described hereinafter.

Interface Description Language

In order to encapsulate an application tool, the user specifies the functions to be performed by the interface program using the interface description language. IDL is a simple C-like language for composing description files utilized by the interface program. It provides constructs for creating object attributes and object events and has simple control constructs to manipulate the run-time environment of the objects. IDL also contains data types for objects, events, object locations, object attributes and simple data types, such as boolean, integer and string Although IDL is designed for a window-based user interface, the window objects, their attributes and their events are independent of any window system implementation. IDL permits users to integrate their own application tools into the CASE system using a simple, high-level language.

When an application tool has been selected for encapsulation and the tasks which it performs are known, the user defines the functions to be performed by the interface program using IDL to develop an interface description file. Specific tasks to be implemented include the following:

1. Define a command tree to accomplish the tasks performed by the application tool.
2. Lay out the window areas including user input areas and program output areas.
3. Program the relationship between menus, dialog boxes, selections and application actions.
4. Define the message interface to the application tool.
5. Define messages to communicate with other CASE system tools through the message server.

The interface description file consists of a series of IDL statements including comments, declarations, statements and functions. An IDL declaration is like a C declaration and begins with a specification of the data type followed by the name being declared and optionally followed by an initial value for the name. Each variable must be declared before it is used. IDL statements and functions specify the actions of the encapsulation program and are used to set attributes of display objects, to describe events to be sensed, to specify actions to be performed in response to events, and to specify the window interface and the application tool interface for the application tool being encapsulated.

The following are the data types utilized in the interface description language.

1. Attribute

Attributes are data which define how an object behaves, such as how it is displayed in a window and what it does when operations are performed on it. Attributes are most often representations of typical window system characteristics and can be named as either strings or identifiers. Attributes can be combined with the merge operator to form an attribute list. An attribute list can describe a behavior or set a value. When a behavior description is used, only the attribute name is specified. When a value is desired, an attribute association is used. The value portion (the right hand side) is associated with the identifier portion (the left hand side) within the scope of the expression. The following attributes are predefined in the encapsulation system.

a) APPEND tells an object that any displayed data is to be appended rather than inserted at the current location.

b) BGCOLOR: String tells an object to set its background color to the closest color supported by the display.

c) CENTERED tells an object that its label is centered within the object d) CODEEDIT tells an edit object that it should use the Codeedit widget which supports syntax-specific editing commands.

e) EDITSIZE: Integer tells an object the number of bytes to allocate for an editor buffer.

f) FGCOLOR: String tells an object to set its foreground color to the closest color supported by the display.

g) FONT: String tells an object to use the given font to display any text it prints.

h) IMAGE: String tells an object the name of a file which represents an image object.

i) INSENSITIVE tells an object to display itself grayed-out so that its action is not accessible.

j) I/O: Integer tells an object that the editor buffer within the object can be accessed by other objects with the specified integer. The integer can be used by certain predefined functions to access the contents of specific editor buffers.

k) HEIGHT: Integer tells an object the height in pixels of the displayed object.

l) LEFTJUSTIFIED tells an object that its label is left justified within the object.

m) POSTLINE tells an object that a newline should be output to the standard display after an event action is performed.

n) PRELINE tells an object that a newline should be output to the standard display before an event action is performed.

o) QUIET tells an edit object which has been associated with the standard output not to display any application output which would normally go to that widget.

p) RIGHTJUSTIFIED tells an object that its label is right justified within the object q) SRCTYPE: String tells a Codeedit object to use behavior appropriate to the syntax of the language specified.

r) SINGLELINE tells an object that all text should be displayed on the same line.

s) STDIN tells an edit object that its buffer is to be associated with or behave as the standard input of the application tool.

t) STDOUT tells an edit object that its buffer is to be associated with or behave as the standard output of the application tool.

u) STDERR tells an edit object that its buffer is to be associated with or behave as the standard error of the application tool.

v) UNMAPPED tells an object that it is not to be visible when initialized.

w) VERBOSE tells an object to echo the string passed to Send—command during its event invocation.

x) WIDTH: Integer tells an object the width in pixels of the displayed object.

2. Boolean

Boolean data values are either true or false.

3. Event

Events describe actions to be performed on an object when a specified pattern is matched. Events can be defined to recognize four types of input: user, application tool, message and system. An object may have one or more of each type of event attached to it. A user event occurs when the user performs some window-based action such as selecting a button in the application window. An application tool event occurs when data is received from the encapsulated application tool. A message event occurs when a message is received by the interface program from the message server. A system event occurs when a system signal is received by the interface program from the operating system.

The syntax of an event declaration is:

event event_var = <type, pattern, action>;

Where type is either a user, application tool, message or system identifier. Pattern is the string pattern to be matched. Action is the action to be performed when the pattern is matched. The action can be a statement or function call or a series of statements or function calls enclosed in parentheses.

4. Integer

Integers are signed numbers which fit into a computer word. In the current embodiment, integers are 32 bit representations.

5. Location

Locations are pairs of integers which describe the logical location of an object on the screen as if the screen were a matrix, with the row as the first number and the column as the second number. The first location is [1, 1] and is the physical top left of the window.

6. Object

There are two types of objects. Those which are managers (manager objects) and those which must be managed (primitive objects). Manager objects may manage other managers or primitive objects. Manager objects include a toplevel manager and a pulldown manager.

A primitive object is a representation of data on which operations can be performed. Objects are most often representations of actions which appear on the screen. However, some objects never have screen data. Objects have the following parameters:

1. Manager - the manager window object that controls the object.
2. Name - a unique identifier for the object.
3. Type - the type of object. Type must be one of the following identifiers: command, edit, image, label, list, menu button, message or toggle.
4. Label - the label to be displayed on the object.
5. Location - the logical location of the object in matrix form.
6. Attribute - the attributes of the object.
7. Event - events recognized from the application tool, the user, the message server or the operating system.
7. String Strings are sequences of characters. They can contain escape characters such as n. The string is null terminated.

Patterns are used to match certain types of input. The input can come from the application tool as text, the user as window events, the message server as messages from other tools in the CASE system, or from the operating system as signals. Patterns are string expressions that are used to match arbitrary inputs sets. Patterns contain different data based on the type of event with which they are to be used. For example, user event patterns are strings which must exactly match the named event from the window system (for example, Select, Release, Execute, Enter, Leave). Message event patterns are data returned from a call to the predefined function Make_message-pattern as described hereinafter Application tool event patterns are strings which are acceptable to the pattern matching facility. System event patterns are strings which must exactly match the name of one of the operating system signals.

Functions in the interface description language are either predefined or user-defined. Predefined functions are built into the interpreter and cannot be redefined. Predefined functions are used for standard operations such as object creation. User-defined functions are defined by the user as a set of IDL statements or expressions and can be used for logical grouping of statements, but are most useful as the called procedure of an event.

The function declaration has the following form.

function function_name (parameter_list)
parameter_specifiers
{function_body}

The IDL function declaration is similar in form to a C function declaration except that the parameter specifiers have optional default specifiers. The function_body may contain local and global variable declarations as well as constant declarations.

The following specifies predefined functions in the interface description language.

1. Add_attribute (obj, attr) adds the specified attribute in the attribute list of the specified object.
2. All_text (n) returns the text of the nth I/O buffer.
3. Append (obj, str) writes the specified string to the specified object.
4. Append_to (obj) changes the currently defined output object to the specified object
5. Clear (obj) removes all data from the specified object
6. Current_selection () returns the currently highlighted text within the window system.
7. Dialog (type, prompt) specifies a prompt string that appears in a dialog box.
8. Display (obj [,obj]) maps specified objects into window objects
9. Epilog (command) specifies a string to be sent to the application tool after the user has selected QUIT from the file menu.

10. Error (message, help, severity, title) is similar to the dialog function except that it indicates an error condition and may be used to terminate the application tool and the encapsulation program. Error messages are displayed in a dialog box.

11. Error_query (command, pattern, success, timeout) is a mechanism to determine the success or failure of a command sent to the application tool.

12. Exclusive (title, item [,item]) brings up a pop-up menu whose elements are exclusive selections.

13. Execute (n) sends the last line of the nth buffer to the operating system shell. The result of the line executed is returned as a string.

14. Fetch (obj, index) returns the indexed line within the specified editable object.

15. Fetch_selected (obj) returns the selected line or lines from the specified editable object 16. Find_object (name) finds the object with the specified name.

17. Get_attribute (obj) gets the attribute list of the specified object

18. Get_context_directory () returns the current context directory

19. Get_context_file () returns the current context file.

20. Get_context_host () returns the current context host.

21. Invocation (command, host, mode) specifies an application tool to be invoked. The host on which the application tool is to be run can be specified.

22. Make_manager (parent, type, name) creates a manager object.

23. Make_message_pattern (type, class, command, host, directory, file, data, ID and tool_name) creates a message pattern string that is used when declaring a message event with the specified fields filled in.

24. Make_object (mgr, name, type, lbl, loc, attr, event [,event]) creates an object. The parameters of the object are (a) manager, the manager window object that controls this object; (b) name, a unique identifier for the object; (c) type, the type of the object; (d) label, the label to be displayed on the object; (e) location, the logical location of the object in matrix form; (f) attribute, the attributes of the object; and (g) events which are recognized from the application tool, the user, the message server or the operating system. The following object type identifiers are utilized: command, edit, image, label, list, menubutton, message and toggle.

25. Message_class () returns the class field of the current message.

26. Message_command () returns the command field of the current message.

27. Message_data (n) returns the nth data field of the current message.

28. Message_directory () returns the directory context field of the current message.

29. Message_file () returns the file context field of the current message.

30. Message_host () returns the host context field of the current message.

31. Message_tool () returns the tool field of the current message.

32. Message_type () returns the type field of the current message.

33. Preamble (command) specifies text to be sent to the application tool prior to display of the toplevel window. This function is useful to send initialization commands.

34. Print (param [,param]) takes any number of parameters of any data type and prints them to the standard output.

35. Quit () exits the encapsulated application tool. This also normally exits the encapsulation program.

36. Replace (obj, index, data) replaces the indexed line in an editable object with the specified data.

37. Search (obj, data, index) searches an editable object for the specified data. The optional index can be used to start the search on a particular line.

38. Select (obj, index, end_index) selects the indexed line or lines in an editable object. If end index is nil, only the indexed line is selected. If end_index is specified, then the lines inclusive from index to end_index are selected. The selected lines are returned.

39. Send_command (text, bool) sends a string of data to the application tool. If an Error_query function is specified, Send_command waits until the Error_query pattern is matched. Send_command then returns true or false based on whether the query pattern is matched.

40. Send_event (object, event) allows a user to programmatically generate an event on an object.

41. Send_message (type, tool class, command, data) sends a message via the message server. The user may specify the type, class, command and data portions of the message. The current context is used for the context portion of the message.

42. Set_context (host_string, dir_string, file string) internally sets the values of the current context.

43. Set_context_directory (dir_string) internally sets the value of the current context directory.

44. Set_context_file (file_string) internally sets the value of the file context.

45. Set_context_host (host_string) internally sets the value of the host context.

46. Start (command, host, connector) transfers control from the interpreter to the event handler and starts the application tool immediately. This should appear in the IDF only after the window environment has been created.

47. String_compare (str 1, str 2, cassen, len) compares two strings. Case sensitivity and length can optionally be specified.

48. String_index (data, index) returns the indexed lines from the specified data.

49. String_length (str) returns the length of a specified string.

50. String_lines (data) returns the number of lines in the specified data.

51. String_make_lines (str, [str]) returns a string of newline separated lines composed of the specified strings.

52. String_portion (str, start, end) returns the portion of a specified string from the specified start to the specified end.

53. String_position (str 1, str 2, cassen, rev) returns the position of a specified string in another string. Case sensitivity can optionally be specified.

54. System (command, host) runs a command in a shell.

55. Tool_class (class) sets the tool class for the entire encapsulation session.

Encapsulation

Figure 6:
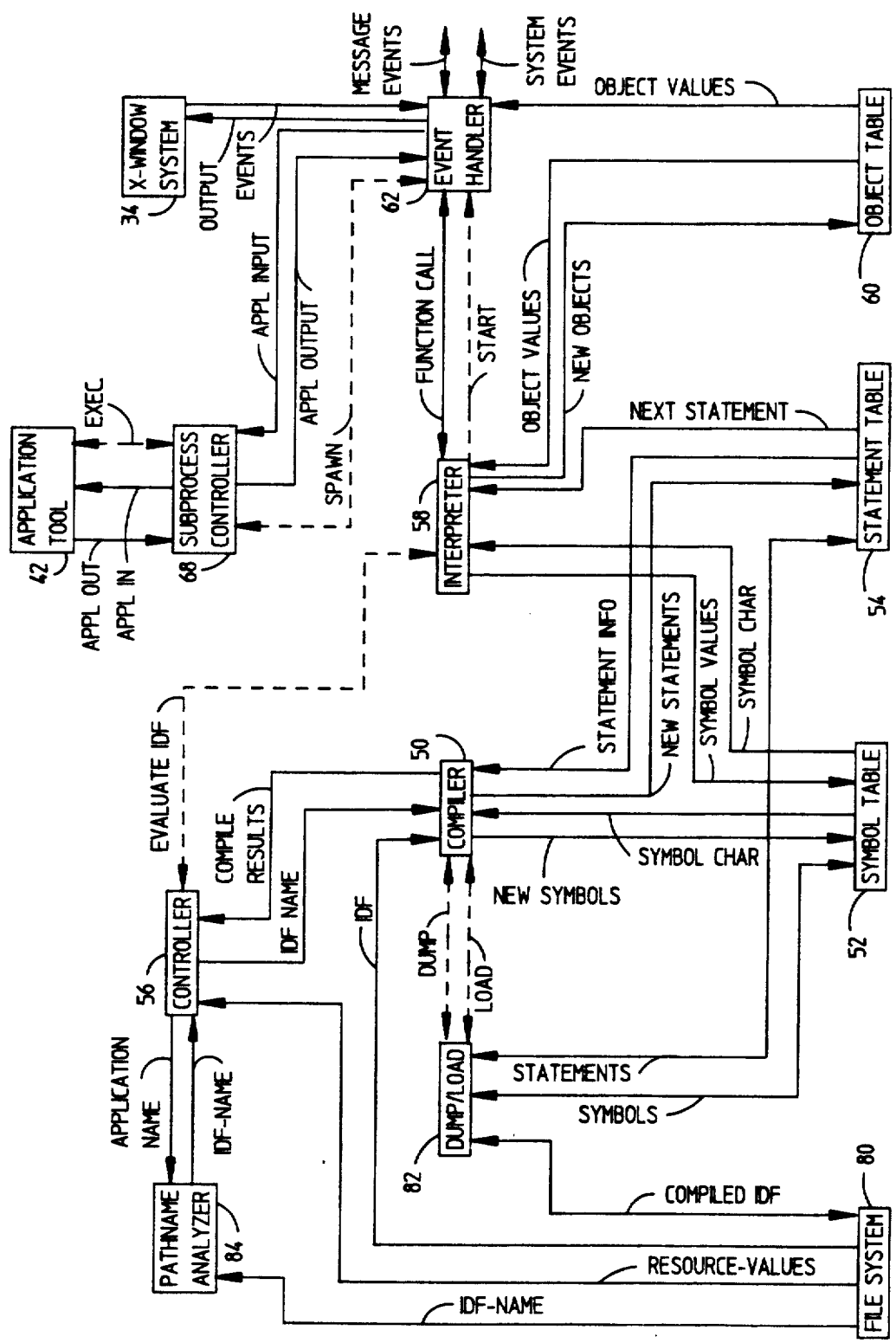
FIG. 6 is a data flow diagram for the encapsulation system of the present invention.

A data flow diagram of the encapsulation system is shown in FIG. 6. Data flow is represented by solid lines between blocks, while control functions are represented by dashed lines. The compiler 50 is a table-driven parser which reads the interface description file from a file system 80 and generates an intermediate code representation, including the symbol table 52 and the statement table 54. The compiler 50 is implemented by supplying a representation of the interface description language in Backus Naur Form to the UNIX tools yacc and lex. The yacc and lex tools operate on the Backus Naur Form to generate the compiler 50. The Backus Naur Form for the interface description language specified hereinabove is attached hereto as Appendix A.

The symbol table 52 generated by the compiler 50 is a table for looking up named variables and functions. The compiler 50 supplies new symbols and associated symbol characteristics to symbol table 52. The symbol table contains the fields: name, type, value and function The name field is the printable name of the symbol. The type field specifies whether the symbol is local or global, and the data type. The value field specifies the value currently associated with the symbol. The function field specifies the function code currently associated with the symbol.

Symbols are stored in the symbol table using a hashing algorithm The hashing algorithm does primary hashing based on the characters of the printable name of the symbol and secondary hashing when primary hashing produces a collision. A collision occurs when more than one symbol produces the same index in the symbol table. The hashing algorithm produces an index that is used for storage of the symbol data. The symbol data is located in the symbol table by again using the hashing algorithm. A simple example of a symbol table is shown in FIG. 7.

The compiler 50 also generates the statement table 54. The compiler supplies new statements and associated statement information to statement table 54. The statement table contains three fields: tag, left hand side, and right hand side. The tag is an identifier of the type of element. The left hand side and the right hand side can be data or a pointer to another entry in the statement table. A simple example of a statement table is shown in FIG. 8.

Figure 9:
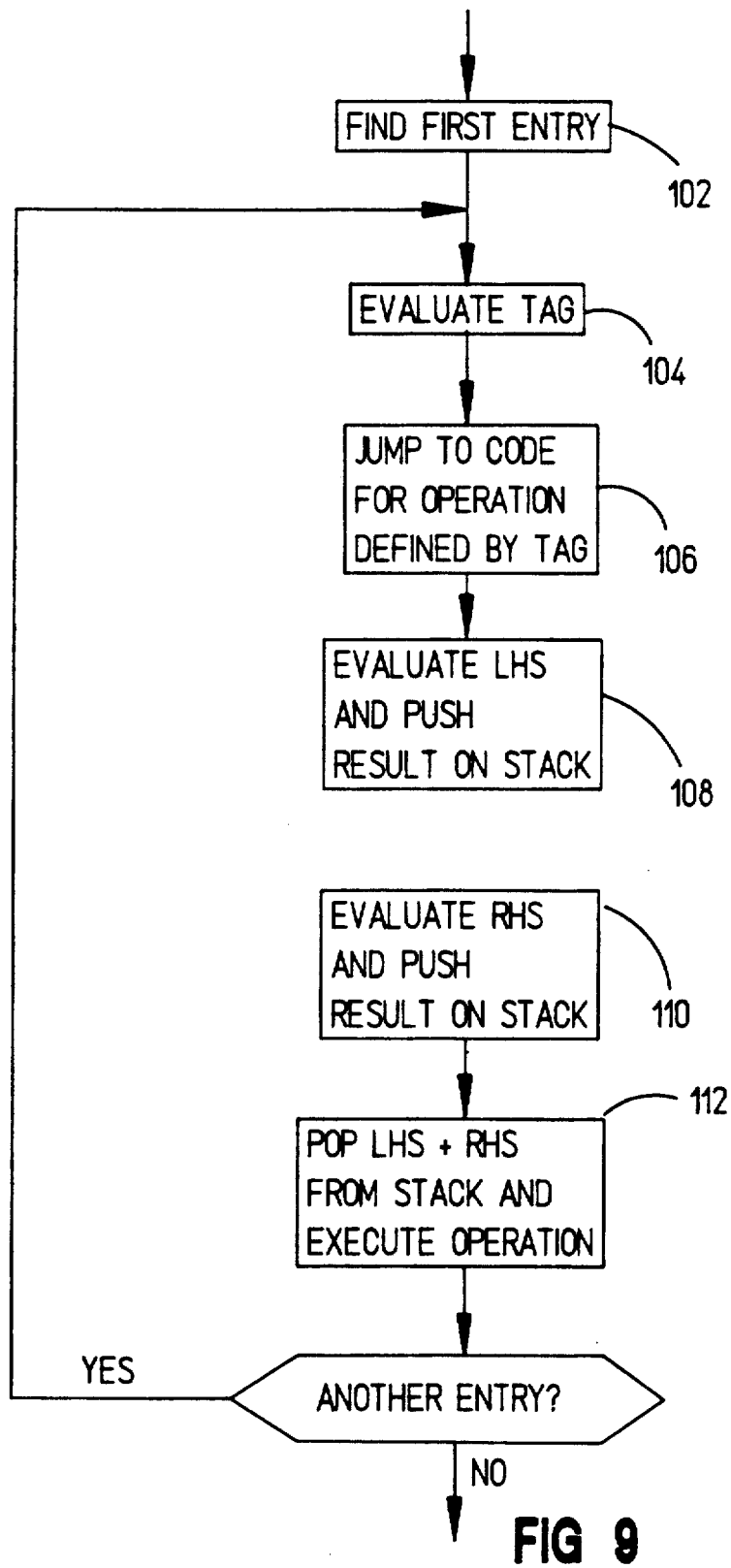
FIG. 9 is a flow diagram illustrating operation of the evaluator.

After the compiler 50 has generated symbol table 52 and the statement table 54 based on the interface description file, an evaluator routine in the interpreter 58 evaluates the statements in the statement table 54. A flow diagram of the evaluator routine is shown in FIG. 9. The evaluator utilizes a pointer to the beginning of the statement table 54 to access the tag field of the first entry in the table in step 102. The evaluator evaluates the tag field in step 104 and then in step 106 jumps to code for performing the operation specified in the tag field of the first entry. In order to complete the evaluation, the left hand side (LHS) and right hand side (RHS) of the statement table entry must be evaluated. The evaluator is called again to evaluate the left hand side and pushes the result on a stack in step 108. The values for the left hand side and the right hand side may be obtained from the statement table field or by reference to the symbol table. When the statement table refers to a symbol, the evaluator jumps to the symbol table and looks up the value of the specified symbol. The right hand side is evaluated, and the result is pushed on the stack in step 110. After the left hand side and the right hand side of the statement have been evaluated, the specified operation is performed, and the value of the statement is returned in step 112. The evaluator then advances to the next entry in the statement table and repeats the evaluation. This procedure is continued until the statement table has been fully evaluated. The evaluation constructs objects that are used during runtime operation as described hereinafter.

The statement table usually contains one or more of the predefined functions discussed hereinabove. When a predefined function is specified by the user, the evaluator jumps to the code representing the predefined function. The predefined functions have predetermined entries in the symbol table with pointers to the code for these functions.

Associated with the evaluator is the stack for storing values during the evaluation process. When the left hand side and the right hand side of a statement table entry are evaluated, the returned values are pushed onto the stack. In some cases, the left hand side and the right hand side of the statement are each single values, while in other cases either or both is a list of values. When the operation specified in the statement table entry is executed, the values are popped from the stack and the value of the operation is determined.

Typically, the final statement at the end of the IDF is a call to the predefined function Start. When the evaluator reaches the Start function in the statement table, it transfers control to the event handler 62.

A simple example will now be given to illustrate the relationship between the IDF, the symbol table 52 and the statement table 54. The IDF for the example is specified below.

```
event e = <User, "Select", Do_it( )>;
attribute a = Quiet | Width:100;
make_object (Parent, "Button 1", Command, "Search",
[1,1], a, e);
start ( );
```

The symbol table and the statement table corresponding to the above example are shown in FIGS. 7 and 8, respectively. The symbol table for the above example includes four entries: the variables e and a and the functions Make_object and Start. The statement table contains the declarations defining e and a and also includes calls to the predefined functions Make_object and Start.

As indicated hereinabove, an object is a data structure which contains user interface and event data. The programmer that generates the interface description file creates and manipulates objects to represent data to a user. There are two classes of objects, managers and primitives. Manager objects can have subobjects which may be either primitives or managers. Primitive objects cannot have any subobjects. All objects have parents except toplevel objects, which are the top of the hierarchy. Some of the interface data of objects is stored in attributes which specify display object behavior. Only primitive objects can have associated events or actions.

The predefined functions Make_manager (manager, type, name, attribute) and Make_object (manager, name, type, label, location, attribute, events) are used to create objects Since all objects (except toplevel objects) have parents, the first parameter is the manager object. This indicates where the object is to be placed in the hierarchy. The type parameter is simply an identifier which specifies what type of object is being created. The name and label parameters are strings which are used as the internal name and the displayable label, respectively, of the object. Locations describe where an object is to be placed in a matrix layout. The location

[1,1] is the top left corner of the matrix. Attributes can be assigned to objects as they are created by passing an attribute parameter. Manager objects do not have events associated with them, but primitive objects can have any number of events specified. The events are stored in an event list within the object so that they can later be retrieved or searched.

The predefined function Find_object (name) takes a string parameter and searches the hierarchy of objects created through the Make_object function for an object of the specified name. It returns the specified object if found, or nil otherwise.

The predefined function Add_attribute (object, attribute) takes an object and an attribute as parameters and merges the specified attribute data into the object. This function is used to change the characteristics of an object after it has been created.

The predefined function Add_event (object, event) associates an event with an object by assigning a pointer to the event data structure into a list within the object data structure.

In operation, the user creates the interface description file to implement the desired functions of the interface program. The compiler 50 reads the IDF and produces the symbol table 52 and the statement table 54 as shown in FIGS. 7 and 8. Then, the evaluator is invoked and evaluates the statement table 54 as described above. The predefined function Make_object generates entries in the object table 60 using the specified parameters for each object When the evaluator reaches the predefined function Start, control is transferred to the event handler 62, and the system is ready to receive events from the user, the message server, the application tool and the operating system.

As indicated hereinabove, the event handler 62 handles the run-time operation of the encapsulation system. It receives events from the user interface, from the message server, from the application tool and from the operating system. The event handler 62 responds to event inputs in accordance with the rules established in the IDF and converted into symbol table 52, statement table 54 and object table 60. Thus, for example, when a button is pushed on the user interface, or a message is received from another tool via the message server, predefined actions are taken. Those actions may include sending a message to the user interface, the message server, the application tool and/or the operating system.

In the present embodiment, the event handler 62 makes use of the callback feature of the X-Window system 34. Objects to be displayed in the window system are defined in the object table 60. The X-Window system 34 includes routines for generating the appropriate display based on input data. The X-Window system 34 is a standard window controller developed by the X-Consortium at Massachusetts Institute of Technology. When an object is to be displayed, the X-Window system 34 makes a callback to the event handler 62 and receives a pointer to the specified object in objecttable 60. Thus, the event handler 62 makes use of the X-Window system 34 in generating objects on the window-based display. The data in the object table 60 defines the characteristics of the object to be displayed.

Most objects in object table 60 have actions or operations associated with them. The actions are specified as events associated with the object. When an object is called in response to a received event, the associated event specified in the object is executed by calling the interpreter 58 to execute the functions or statements specified by the event.

The X-Window system 34 receives inputs from the user in the form of mouse inputs and keyboard inputs. Such inputs constitute user events. The X-Window system 34 is also utilized to receive events from the message server and from the application tool. In each case, the X-Window system 34 makes a callback to the appropriate object in object table 60. The event handler 62 through the interpreter 58 executes any required operations specified in the object.

Routines for handling different input event types are shown in FIGS. 10A-10D. When an event is received, the appropriate handler routine is called.

When a user event is received by the X-Window system 34 in step 120, a callback is made to the appropriate user object in the event handler 62, as indicated in step 122. In the case of a user event, the X-Window system 34 obtains from the object data for producing the required window display. In addition, the object typically includes one or more associated events which defines actions to be taken in response to the user event. The action is executed by invoking the interpreter 58 on the event definition, as indicated by step 124. Thus, the user event produces a window display, if necessary, and may cause other actions such as sending messages to the application tool or to the message server.

Figure 10B:
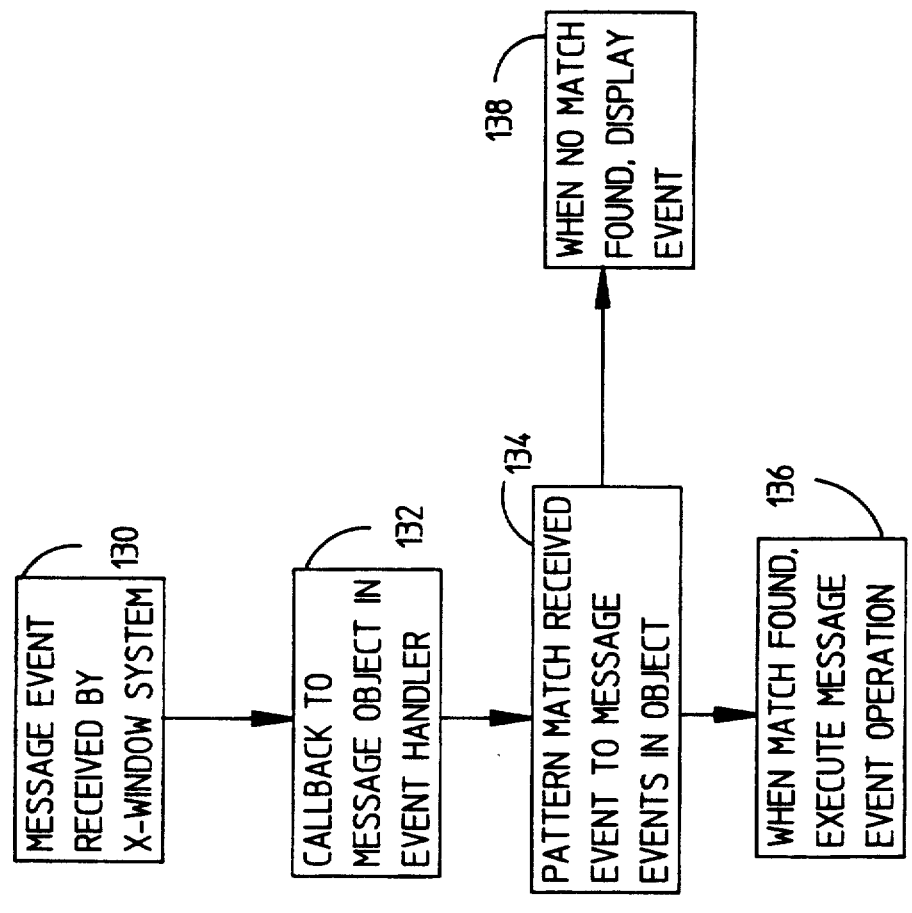
FIGS. 10A-10D are flow diagrams illustrating routines executed by the event handler in responding to incoming events.
Figure 10A:
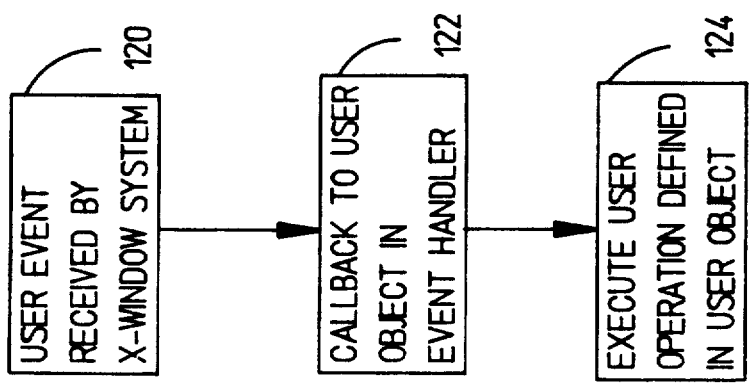

Referring now to FIG. 10B, when a message event is received from the message server by the X-Window system in step 130, a callback is made to the message object in the event handler 62 (step 132). The message object typically includes a number of events, each including a pattern as described above. The received pattern is matched against each of the stored event patterns contained in the message object, as indicated in step 134. When a match is found, the action contained in the matching event is executed by invoking the interpreter 58 on the action definition contained in the event (step 136). If no match is found, the event is displayed on the standard output in step 138. Typically, the standard output is the window-based display.

Figure 10D:
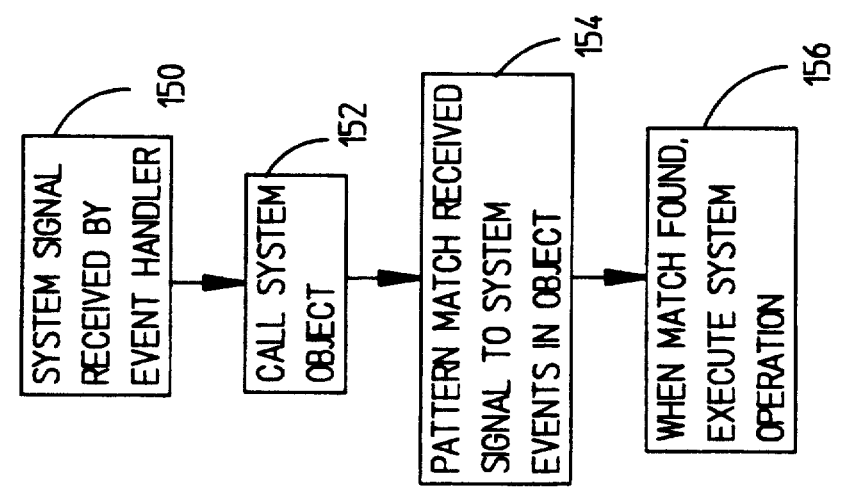
Figure 10C:
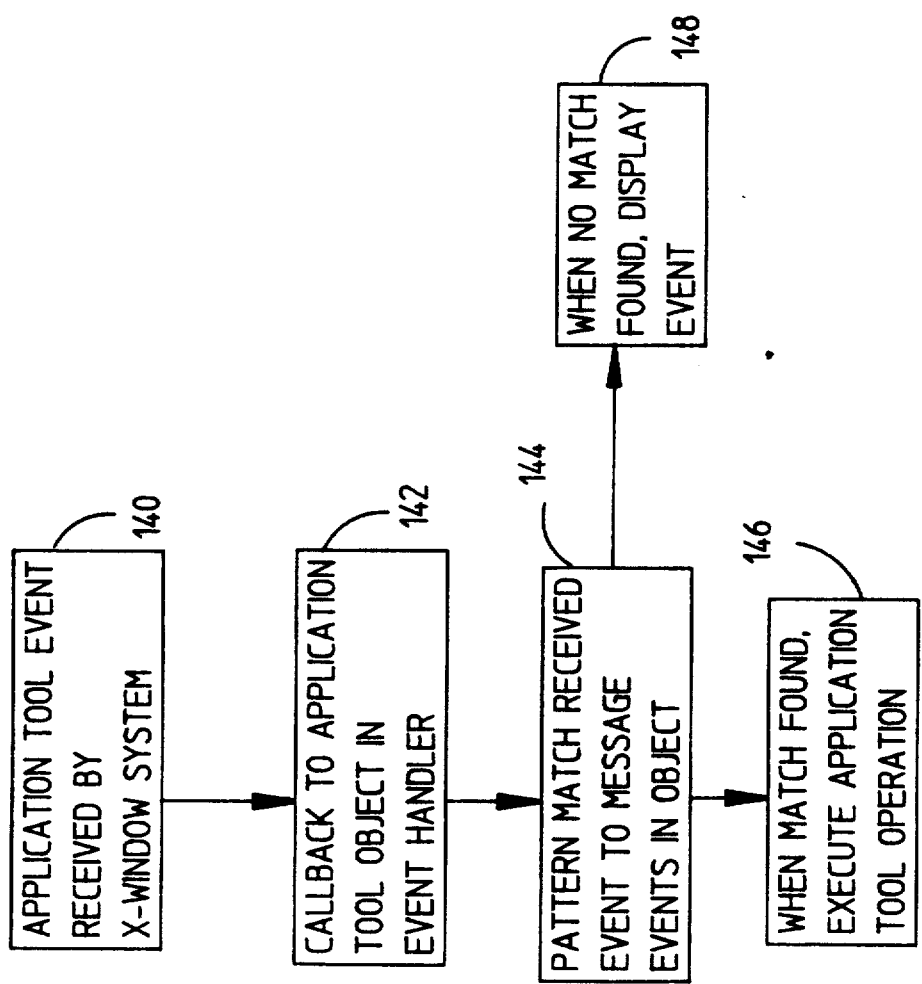

Referring now to FIG. 10C, an application tool event is handled in a manner similar to a message event. When an application tool event is received by the X-Window system 34 in step 140, a callback is made to the application tool object in the event handler 62 in step 142. The received data is pattern matched to the stored event patterns contained in the application tool object until a match is found (step 144). When a match is found in step 146, the action contained in the matching event is executed. If no match is found, the application tool event is displayed on the standard output in step 148.

As described above, user events, message events and application tool events are received by the X-Window system 34. This configuration takes advantage of capabilities of the X-Window system for receiving events. From a logical viewpoint, events are actually received from the event handler 62.

Referring now to FIG. 10D, a system signal from the operating system is received by the event handler 62 in step 150 (rather than being received by the X-Window system 34). The system object is called in step 152 and the received signal is matched in step 154 against stored event patterns in the system object. When a match is found, the operation specified in the matched event is executed in step 156. In the case of system signals, the string which represents the signal name is used for matching. System signals include standard UNIX operating system signals such as Terminate or Interrupt commands.

A number of the predefined functions described above are utilized in implementation of the event handler 62. The predefined function Display (toplevel objects) is responsible for creating the X-Window system representations for each of the specified toplevel objects as well as all of the subobjects under each toplevel object. If a specified object is not a toplevel object, then it will be ignored. The display function is implemented by traversing the object hierarchy starting with each of the specified toplevel objects. For each object, a call is made to the X-Window system 34 to instantiate that object. That is, a data space is created and filled in, and the object is mapped onto the display screen. When all the objects under the toplevel object have been created, the entire window is realized or displayed.

The predefined function Start (command, host, connector) has two main responsibilities. It attempts to start the encapsulated application tool 42 and it passes program control to the event handler 62. The event handler 62 is simply a loop which accepts events from the X-Window system 34 and processes them by calling the appropriate routines in the event handler. The command and host parameters of the function are strings. The command is the operating system command to be executed or program invocation for the application tool 42. The host is the name of the machine on which the command is to be executed. The connector is an identifier which identifies the mode in which the application tool is to be connected. The mode can be either terminal or pipe. Terminal mode is used when the application tool is designed to run on a terminal Pipe mode is used for most applications when raw data can be read from the output of the application tool 42. The Start function is implemented via calls to the subprocess controller 68 as described hereinafter. The SPC_Open command establishes a connection to the application tool, and SPC_Spawn executes the command string.

Since control is passed to the event handler by the Start function, the Start function does not return until the application tool has quit by either the Quit function or when the user selects the Quit menu item in the file menu of the main window.

The predefined function Quit is used to return control from the event handler 62 back to the interpreter 58. This is done by setting a variable that indicates to the event handler processing loop that it can return. Since the processing loop was the one called by the Start function, the evaluator continues processing user code at the point after that call.

The predefined function Return_from (object) is used to remove a window which was previously initialized using the display function. The Return_from function removes the window from the display screen but does not deallocate the memory for it, so further calls to display the object will bring the window back in the same state as when the function was called.

The predefined function Stop (callback) attempts to kill the application tool 42 by sending it a UNIX signal which instructs it to terminate. It does this through the call SPC_Kill_Process in the subprocess controller 68. If the boolean parameter is true, then the Stop function also calls a user definable function named Termination, if that function is defined by the user, when the application tool actually terminates.

The predefined function Error_query (query, pattern, success, timeout) is used in conjunction with the Send command function to verify the error status and wait for process completion of a command by the application tool. The Error-query function simply records the specified parameter data which is then used by the Send_command function. The query pattern and success parameters are strings, and the timeout parameter is an integer.

The predefined function Send_command (command, newline) delivers data from the interface program 40 to the application tool 42. The command parameter is a string to be delivered, and the newline parameter is a boolean which indicates whether to send a newline at the end of the string. This function is implemented by a call to SPC_Write, one of the routines of the subprocess controller 68 as described hereinafter The string data is written to the input file descriptor of the application tool 42. The Send_command function returns true unless it cannot write the command string to the application tool.

The behavior of the Send_command function is modified when the user has previously made a call to the Error_query function The Error query function is used to verify error status and wait for process completion of a command. If the Error_query function has been called, the Send_command function delivers the query string after it has written the command string. The query string is then executed by the application tool after the command string. The Send_command function then attempts to match the pattern string, also specified in the Error_query function When matched, it compares that string to the success string from the Error_query function If these strings are the same, then the send-command function returns true; otherwise it returns false. If the pattern being looked for cannot be found in the number of seconds specified by the timeout parameter of the Error_query function, then the Send_command function returns false.

The predefined function Send_event (object, event) allows a user to programmatically generate an event on an object. Typically, events such as user events, those that happen in the window system, are generated when the user actually selects an object window. The Send_event function calls the same handler routine that would have been called if the user had generated the event.

The predefined function System (command, host) is one way that the user can execute arbitrary operating system commands, either locally or remotely. Both parameters are strings. The command string is the operating system command to be executed, and may include any operating system command or program invocation. The host is the name of the machine on which execution is to be attempted The System function returns a string which is the data written as the output of the executed command, or the nil string if the command cannot be executed or the host cannot be found.

The System function is implemented through calls to the subprocess controller 68 A call to the routine SPC Open is used to establish the connection for executing a subprocess. Then, a call to SPC_Spawn is used to execute the specified command string in a shell.

Messages are the strings which are passed by the message server The predefined function Send_message (type, class, command, data) delivers a message to the message server It first creates a message string based on the specified parameters, which are strings, and then writes that message string to the message server. The Send_message function inserts the currently-set context into the newly created message string before it delivers the message.

The predefined function Make_message pattern (type, class, command, host, directory, file, data, ID, name) creates a string that is passed to the message server. Any messages received by the message server from other tools and matching this pattern will be forwarded to the encapsulation system. The Make_message_pattern function takes string parameters which will be used as the components of the message pattern. If a parameter is nil, then a wildcard is substituted for that parameter. This implies that any token will match that particular field. This function returns the newly created string which is then passed to the message server through a message event request.

Each of the predefined functions Message_tool, Message_ID, Message_type, Message_class, Message_command, Message_host, Message_directory, Message file, and Message_data (index) returns a string which is a field of the most recently received message. For instance, the Message_command function returns the command field of the last message that arrived. The Message_data function takes a single parameter that indicates the data field to be retrieved indexed from one. That is, Message_data (2) returns the second data field of the last message received. Messages can have zero or more data fields with no upper limit.

The predefined function Tool_class (class) takes a string parameter and assigns a tool class to the encapsulated application tool 42. The tool class is used to determine what class of messages should be delivered to the message system.

The term "context" is used to describe the current location of data on which a tool is operating. In the encapsulation system, the current context is also used as the current operating directory. In other words, when the user sets the context, the encapsulation system attempts to set its current directory to the same context. The predefined functions Get_context, Get context_directory, Get_context_file, and Get_context_host take no parameters, and each returns a string which reflects the current context or component thereof.

The predefined functions Set_context (host, directory, file), Set context host (host), Set_context_directory (directory) and Set_context_file (file) take string parameters and attempt to set the component or components of the current context. They return true if the current context is a known directory on a known machine. Otherwise, they return false. Also, if the context is found, then the current working directory of the encapsulation system is set to the same context.

The predefined function Make_filename (host, directory, file, exist) creates and returns a new string which is a pathname to a file. The file may be either local or remote. The Make_filename function uses the underlying platform distributed data mechanism to create the string. The parameters host, directory and file are strings, while the exist parameter is a boolean. If either of the parameters host or directory do not represent a real machine or directory, then the nil string is returned. Also, if the user passes the value true for the exist boolean, then the Make_filename function only returns the string pathname if the file exists. Otherwise, it returns the nil string.

The event handler 62 in communicating with the application tool 42, utilizes the subprocess controller 68. The subprocess controller 68 is a CASE system library routine which permits execution of subprocesses either locally or remotely. The subprocess controller 68 permits execution of the application tool 42 through calls to a library.

In a standard UNIX system, the process control call "Fork" is used to create space for a subprocess, and the call "Exec" is used to execute the subprocess. Communication with the subprocess may be by a UNIX pipe (pipe mode), which is simply a string of data or by pty, a UNIX mode which formats the data in the same manner as a terminal (terminal mode). In the terminal mode, the subprocess appears to be communicating with a terminal. The use of Fork, Exec, pipe mode and terminal mode in standard UNIX systems is limited to local operation.

The subprocess controller 68 of the present invention permits the application tool 42 to be executed either locally or remotely without requiring the encapsulation system to know how to invoke execution locally or remotely.

Figure 12:
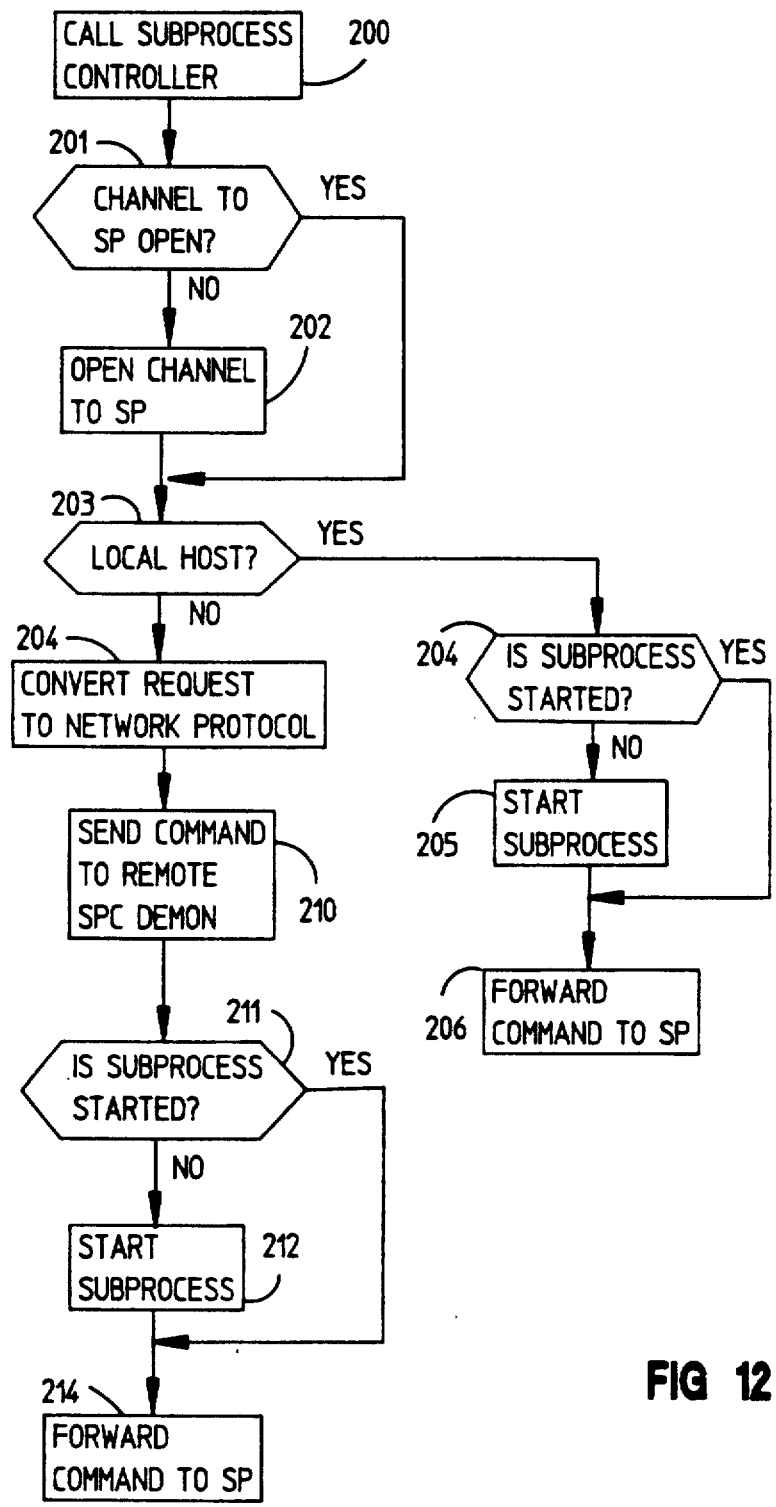
FIG. 12 is a flow diagram illustrating operation of the subprocess controller.

The structure of the subprocess control mechanism is shown in FIG. 11. A flow diagram of subprocess controller operation is shown in FIG. 12. When a process 170 (such as event handler 62) wishes to communicate with a subprocess 172 or 174 (such as application tool 42), the subprocess controller 176 (SPC) is invoked in step 200. A check is made in step 201 to determine if a channel has previously been opened to the subprocess. If a channel to the subprocess is not open, the first command is to open a channel to the subprocess (step 202). The open channel command is of the form SPC_Open (Host, I/O mode). The open command specifies the host where the subprocess is to be run, and the I/O mode contains descriptions of the channel behavior, such as pipe mode or terminal mode, and whether write, output and error operations will be performed. The subprocess controller includes a channel routine 178 to establish communication with local subprocess 172 on a local computer 180 or remote subprocess 174 on remote computer 182. The subprocess controller also includes for each channel opened a channel data structure which contains data, including host and I/O mode information, relating to the channel. When the channel routine 178 determines in step 203 from the host information that local execution is required, a check is made in step 204 to determine if the subprocess has previously been started. If the subprocess has not previously been started, the Fork and Exec calls are utilized directly in accordance with the specified I/O mode to create space for and execute the local subprocess (step 205). The command is then forwarded to the subprocess in step 206.

When the channel routine 178 determines in step 203 from the host information that remote execution is required, the parameters in the command are interpreted and converted in step 208 into a protocol that is sent through the network to the remote computer 182 (step 210). The protocol is a character string including a command identifier, a channel number and a string of data. The remote computer 182 contains a routine known as an SPC Demon 184. The SPC Demon 184 listens on the network for data and then takes appropriate action. The SPC Demon interprets the protocol and performs the required action as if it were local execution of the subprocess. A check is made in step 211 to determine if the subprocess has previously been started. If the subprocess has not previously been started, the SPC Demon calls Fork and Exec on the remote computer 182 and utilizes either the pipe or terminal mode of communication to create space for and execute the remote subprocess 174, (step 212). The command is then forwarded to the subprocess in step 214.

After a channel has been opened to the subprocess, or application tool, a spawn command is used to invoke the subprocess. The spawn command is of the form SPC Spawn (channel, process data). The SPC_Spawn command is sent only after the channel has been opened. Additional process control functions used by the subprocess controller include SPC_Open_and_S-pawn which opens a channel and invokes a subprocess, SPC_Execute_Process which restarts a new subprocess on a previously-opened channel; SPC_Reset, which resets a channel; SPC_Close, which closes a channel and frees any resources allocated to it; and SPC_Attach which attaches a currently running process to a channel.

After a channel has been opened and a subprocess has been invoked, the encapsulation system can communicate with the application tool. The following functions are utilized to communicate with the application tool.

1. SPC_Read reads from an SPC channel into a buffer.
2. SPC_Write writes from a buffer to an SPC channel.
3. SPC_Kill_Process kills an executing subprocess through a specified SPC channel.
4. SPC_Kill_Processes kills all executing subprocesses.
5. SPC_Interrupt_Subprocess interrupts the subprocess on an SPC channel.
6. SPC_Signal_Process sends a specific operating system signal to an executing subprocess on an SPC channel.
7. SPC_Register_Terminator registers a callback to be invoked whenever a subprocess dies.
8. SPC_Add_Input registers a callback to be invoked whenever input from the subprocess is available.

In general, the subprocess controller is a library which can be utilized to open an arbitrary number of channels to an arbitrary number of subprocesses located either locally or remotely. Each subprocess can operate either in the pipe mode or the terminal mode, and any mode of communication including write only, read only, error only and combinations thereof can be utilized for each channel. By using the subprocess controller, it is not necessary for the encapsulation system to know the details of local or remote communication. The subprocess controller is not limited to use with the ecapsulation system. It can be used for communication between any process or tool and any subprocess.

Figure 13:
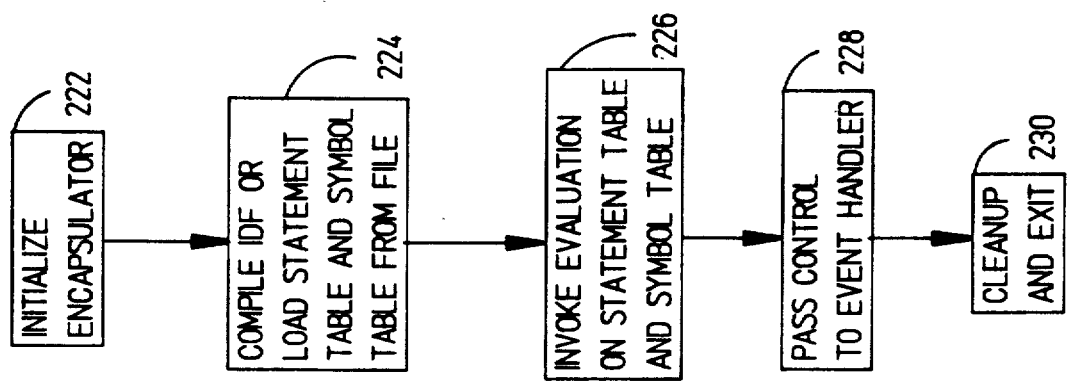
FIG. 13 is a flow diagram illustrating the operation of the encapsulator controller and FIG. 14 is an example of a window display for an encapsulated version of a tape archive tool.

A main controlling loop for the encapsulation system, shown in FIG. 6 as controller 56, controls the compiling and evaluation of the interface description file. As shown in FIG. 13, the controller 56 initializes the encapsulation system in step 222. If the IDF has not been compiled, the controller 56 instructs compiler 50 to load the IDF from file system 80 and to compile the results in symbol table 52 and statement table 54 (step 224). If the IDF was previously compiled and the symbol table and statement table have been stored in the file system, the controller 56 instructs a dump/load unit 82 to load the symbol table and the statement table from the file system 80, so that the symbol table 52 and statement table 54 are available for evaluation. Then in step 226, the controller 56 invokes interpreter 58, causing the statement table 54 to be evaluated as described hereinabove. Next, control is passed from the interpreter 58 to the event handler 62 in step 228. When control is passed to the event handler 62, the encapsulation system is ready for run-time operation, and the controller 56 is no longer involved. The controller 56 cleans up and exits in step 230.

As indicated above, the dump/load unit 82 is used to load previously-compiled IDF's and to store compiled IDF's in the file system 80 for future use. The dump/load unit 82 provides the capability to utilize the encapsulation system in a read-only configuration. An IDF is developed for a particular application tool, and the IDF is compiled to generate a symbol table and a statement table. The compiled IDF can subsequently be used on the same system or on different systems. Thus, the IDF is generated once, and the compiled IDF is provided to other users. A pathname analyzer 84 is utilized to find files invoked by the user in connection with the encapsulation system.

Figure 14:
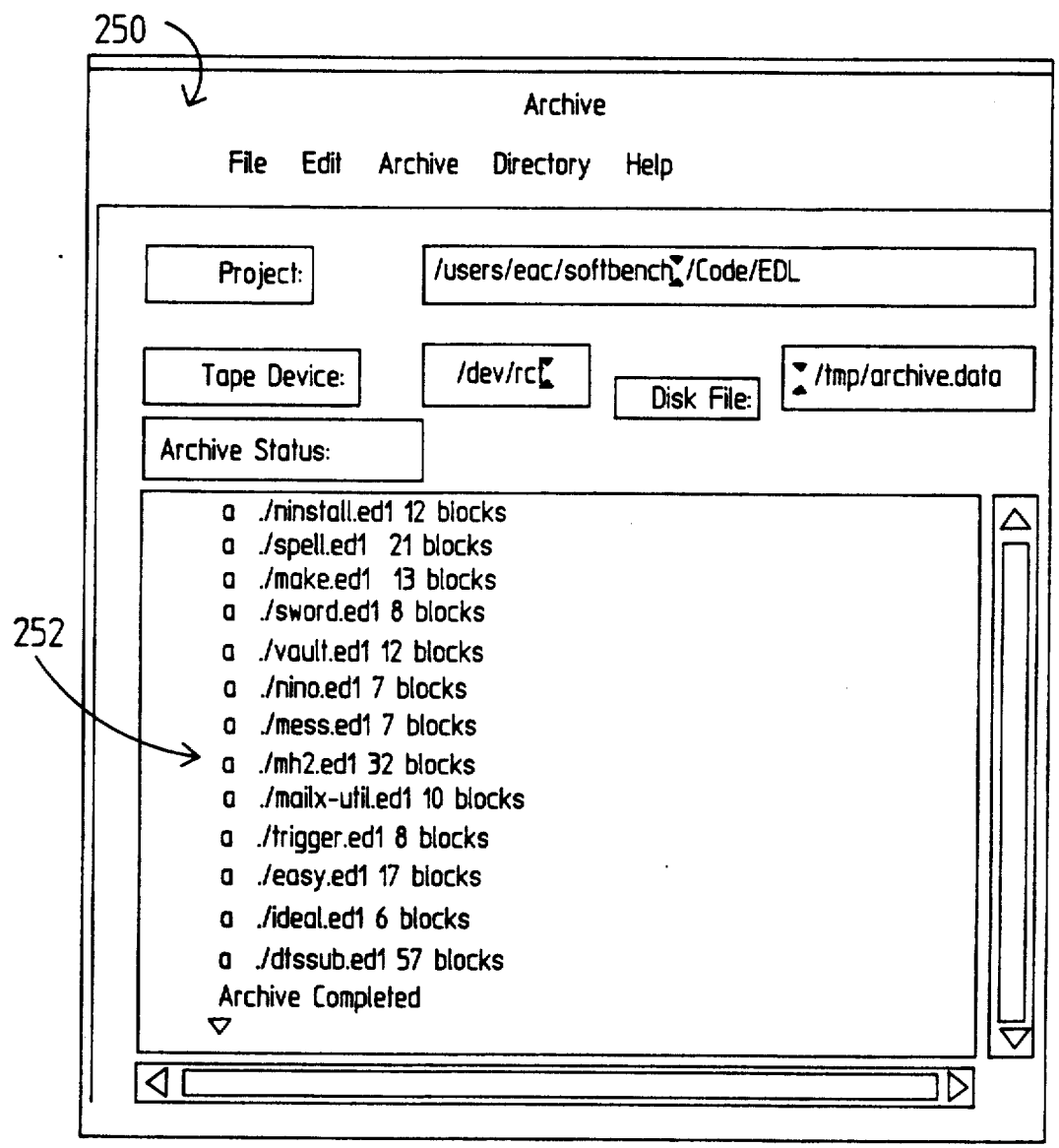

An example of a window display for an encapsulated application tool is shown in FIG. 14. The UNIX system tool "tar", a tool for tape file archiving, was encapsulated in accordance with the present invention. The window display of FIG. 14 includes a pulldown menu area 250, an identification of the project tape device and disk file, and an edit window 252 which shows the output from the encapsulated tape archive tool.

The encapsulation system of the present invention has been described herein as having a user interface via X-Window system 34, a message interface to the message server, a system interface to the operating system and an application interface to the application tool 42. This is the most general form of the encapsulation system. In some cases, various interfaces may be omitted. The user interface may be omitted if the application tool is to automatically perform a function based on a message input. For example, a message from one or more of the other tools in the system may cause the application tool to store a file on tape without user intervention. In other cases, a message interface with other tools in the CASE system is not required and all interaction with the application tool 42 occurs through the user interface. In still other situations, the application tool itself may be omitted and the encapsulation system may be utilized to perform a desired function in the CASE system without interfacing to an application tool. In all of these cases, the interface description language is used to create an IDF which defines the operations to be performed in responding to events from one or more sources.

While the present invention has been described in connection with a CASE system, it is not limited to use in CASE systems. It will be understood that the specific functions performed by the other tools in the system are not relevant to the present invention.

While there have been shown and described what are at present considered the preferred embodiments of the present invention, it will be obvious to those skilled in the art that various changes and modifications may be made therein without departing from the scope of the invention as defined by the appended claims.

APPENDIX A

```
<file> ::= <definition> *

<definition> ::= <function_def> | <declaration> | <statement>

/*
 * Function definition
 */

<function_def> ::= function <identifier> ( <parameter_list> ) <function_body>

<parameter_list> ::= <declarator_list> *

<function_body> ::= { <parameter_decl> } <compound_statement>

<parameter_decl> ::= <var_spec> <decl_spec> <init_decl_list> ;

/*
 * Variable Declarations
 */

<declaration> ::=
        <residence_spec> <var_spec> <decl_spec> <init_decl_list> ;

<residence_spec> ::= local | global | <empty>

<var_spec> ::= constant | <empty>

/*
 * Data Type declarations
 */

<decl_spec> ::= attribute | boolean | event | integer | object | string

<init_decl_list> ::= <init_decl> | <init_decl_list> , <init_decl>

<init_declarator> ::= <identifier> | <identifier> = <initializer>

<declarator_list> ::= <identifier> | <declarator_list> , <identifier>

<initializer> ::= <constant_expr>

/*
 * Statements
 */

<statement> ::= <compound> | <expression> | <selection> | <iteration> | <jump>

<label> ::= <identifier> :

<compound> ::= { <statement_list> }

<scoped_statement> ::= <declaration> | <statement>

<statement_list> ::= <scoped_statement> *

<expression> ::= ; | <expr> ;

<selection> ::= if ( <expr> ) <statement> |
                if ( <expr> ) <statement> else <statement>

<iteration> ::= while ( <expr> ) <statement>

<jump> ::= break ; | continue ; | goto <expr> ; | RETURN expr ;

/*
 * Expressions
 */

<expr> ::= <assignment_expr> | <expr> , <assignment_expr>
```

```
<assignment_expr> ::= <conditional_expr> | <unary_expr> = <assignment_expr>

<conditional_expr> ::=
        <logical_or_expr> |
        <logical_or_expr> ? <logical_or_expr> : <conditional_expr>

<logical_or_expr> ::= <logical_and_expr> |
                <logical_or_expr> <or_op> <logical_and_expr>

<logical_and_expr> ::= <or_expr> | <logical_and_expr> && <or_expr>

<or_expr> ::= <attr_expr> | <or_expr> <or_op> <attr_expr>

<or_op> ::= |

<attr_expr> ::= <and_expr> | <attr_expr> : <and_expr>

<and_expr> ::= <equality_expr> | <and_expr> & <equality_expr>

<equality_expr> ::= <relational_expr> |
                <equality_expr> == <relational_expr> |
                <equality_expr> != <relational_expr>

<relational_expr> ::= <add_expr> |
                <relational_expr> < <additive_expr> |
                <relational_expr> > <additive_expr> |
                <relational_expr> <= <additive_expr> |
                <relational_expr> >= <additive_expr>

<add_expr> ::= <mult_expr> |
        <add_expr> + <mult_expr> |
        <add_expr> - <mult_expr>

<mult_expr> ::= <unary_expr> |
        <mult_expr> * <unary_expr> |
        <mult_expr> / <unary_expr> |
        <mult_expr> % <unary_expr>

<unary_expr> ::= <postfix_expr> | ++ <primary_expr> | -- <primary_expr> |
        <unary> <unary_expr>

<postfix_expr> ::= <primary_expr> | <primary_expr> ++ | <primary_expr> --

<primary_expr> ::= <string_literal> | <constant> | <literal> |
        < <identifier> , <constant_expr> , <primary_expr> > |
        ( <decl_spec> ) <primary_expr> |
        ( <expr> ) | <function_expr> | <identifier>

<constant_expr> ::= <conditional_expr>

<function_expr> ::= <identifier> ( ) | <identifier> ( <expr> )

<identifier> ::= <letter> <letter_digit_underscore> *

<letter_digit_underscore> ::= <letter> | <digit> | _

<string_literal> ::= " <any_char> * "

<constant> ::= <decimal> | <octal> | <hex>

<decimal> ::= <digit> +

<octal> ::= 0 <digit> +

<hex> ::= 0 <x> <hex_digit> +

<x> ::= x | X

<hex_digit> ::= <digit> | A | B | C | D | E | F | a | b | c | d | e | f

<unary> ::= + | - | ! | $

<literal> ::= nil | NULL | True | False
```

```
empty ::=

/*
 * These are groups of chars making up identifiers, strings, and numbers
 */

<digit>    ::= 0 | 1 | 2 | 3 | 4 | 5 | 6 | 7 | 8 | 9

<letter>   ::= a | b | c | ... | z | A | B | C | ... | Z

<any_char> ::= /* I didn't fill this in, but it means any known char */
```

What is claimed is:

1. A method for encapsulating a computer software application tool into a computer-aided software development system so that the encapsulated application tool functions in said software development system, said software development system including an electronic digital computer and computer software for operating said computer, said computer software comprising a user interface, an operating system and one or more software development tools for performing predefined software development tasks, said method comprising the steps of:

said system converting an interface description file that defines a predetermined behavior in responding to predefined events received from the development tools and from the user interface into a set of software data structures for representing said behavior;

said system responding to said predefined events received from the development tools and from the user interface by evaluating portions of said data structures corresponding to said predefined events; and said system requesting action by said application tool when required by said portions of said data structures.

2. A method for encapsulating an application tool as defined in claim 1 wherein the step of converting an interface description file includes the step of compiling the interface description file to generate a symbol table defining the symbols in the interface description file and a statement table defining the operations in the interface description file.

3. A method for encapsulating an application tool as defined in claim 2 wherein the step of converting an interface description file includes the step of evaluating said symbol table and said statement table to generate objects containing events defining operations which are performed when responding to said predefined events.

4. A method for encapsulating an application tool as defined in claim 3 wherein the step of responding to said predefined events includes the step of matching a received event to patterns stored in said data structures to identify an event corresponding to the received event.

5. A method for encapsulating an application tool as defined in claim 4 wherein the step of responding to said predefined events further includes the step of evaluating and executing an operation contained in the stored event that matches the received event.

6. A method for encapsulating an application tool as defined in claim 1 further including the step of said system responding to application events received from said application tool by evaluating portions of said data structures corresponding to said application events.

7. A method for encapsulating an application tool as defined in claim 1 further including the step of said system responding to system events received from said operating system by evaluating portions of said data structures corresponding to said system events.

8. A method for encapsulating an application tool as defined in claim 1 wherein the step of requesting action by said application tool includes the steps of;

determining whether the application tool is to be executed locally or on a remote host computer, when the application tool is to be executed locally, forwarding a request directly to the application tool, and when the application tool is to be executed on a remote host computer, forwarding a request to the remote host computer.

9. A method for encapsulating an application tool as defined in claim 1 further including the step of said system responding to predefined notifications received from the development tools by triggering predefined operations that are defined in said data structures.

10. A method for encapsulating an application tool as defined in claim 1 wherein the step of responding to said predefined events includes the step of communicating with the user through a window display controller.

11. A method for encapsulating an application tool as defined in claim 3 wherein the step of generating objects includes the step of associating objects with events structures defining operations to be performed when responding to said predefined events.

12. A method for encapsulating an application tool as defined in claim 11 wherein the step of responding to said predefined events further includes the steps of identifying an object corresponding to the received event and executing an operation contained in the event structure associated with the object.

13. A method for encapsulating a computer software application tool into a computer system so that the encapsulated application tool functions in said computer system, said computer system including an electronic digital computer and computer software for operating said computer, said computer software comprising a user interface, an operating system and one or more standard software tools for performing predefined tasks, said method comprising the steps of:

said computer system converting an interface description file that defines a predetermined behavior in responding to predefined events received from the standard software tools and from the user interface into a set of software data structures for representing said behavior;

said computer system responding to said predefined events received from the standard software tools and from the user interface by evaluating portions of said data structures corresponding to said predefined events; and said computer system requesting action by said application tool when required by said portions of said data structures.

14. A method for encapsulating an application tool as defined in claim 13 wherein the step of converting an interface description file includes the step of compiling the interface description file to generate a symbol table defining the symbols in the interface description file and a statement table defining the operations in the interface description file.

15. A method for encapsulating an application tool as defined in claim 14,/.wherein the step of converting an interface description file includes the step of evaluating said symbol table and said statement table to generate objects containing events defining operations which are performed when responding to said predefined events.

16. A method for encapsulating an application tool as defined in claim 15 wherein the step of responding to said predefined events includes the step of matching a received event to patterns stored in said data structures to identify an event corresponding to the received event.

17. A method for encapsulating an application tool as defined in claim 16/wherein the step of responding to said predefined events further includes the step of evaluating and executing an operation contained in the stored event that matches the received event.

18. A method for encapsulating an application tool as defined in claim 13 wherein the step of requesting action by said application tool includes the steps of;
determining whether the application tool is to be executed locally or on a remote host computer,
when the application tool is to be executed locally, forwarding a request directly to the application tool, and
when the application tool is to be executed on a remote host computer, forwarding a request to the remote host computer.

19. A method for encapsulating an application tool as defined in claim 13 further including the step of said computer system responding to predefined notifications received from the standard tools by triggering predefined operations that are defined in said data structures.

20. A method for encapsulating a computer software application tool into a computer-aided software development system so that the encapsulated application tool functions in said software development system, said software development system including an electronic digital computer and computer software for operating said computer, said computer software comprising a user interface, an operating system and one or more software development tools for performing predefined software development tasks, said method comprising the steps of:
said system converting an interface description file that defines a predetermined behavior in responding to predefined events received from the development tools into a set of software data structures for defining said behavior;
said system responding to predefined events received from the development tools by evaluating portions of said data structures corresponding to said predefined events; and
said system requesting action by said application tool when required by said portions of said data structures.

21. A method for encapsulating a computer software application tool into a computer-aided software development system so that the encapsulated application tool functions in said software development system, said software development system including an electronic digital computer and computer software for operating said computer, said computer software comprising a user interface, an operating system and one or more software development tools for performing predefined software development tasks, said method comprising the steps of:
said system converting an interface description file that defines a predetermined behavior in responding to predefined events received from the user interface into a set of software data structures for defining said behavior;
said system responding to predefined events received from the user interface by evaluating portions of said data structures corresponding to said predefined events; and
said system requesting action by said application tool when required by said portions of said data structures.

22. A method for encapsulating a computer software application tool into a computer-aided software development system so that the encapsulated application tool functions in said software development system, said software development system including an electronic digital computer and computer software for operating said computer, said computer software comprising a user interface, an operating system and one or more software development tools for performing predefined software development tasks, said method comprising the steps of:
said system compiling an interface description file that defines predetermined operations in responding to predefined events received from the development tools and from the user interface to generate a symbol table defining symbols in the interface description file and a statement table defining operations in the interface description file;
said system evaluating said symbol table and said statement table to generate objects defining operations which are performed when responding to said predefined events;
said system responding to said predefined events received from the development tools and from the suer interface by evaluating objects corresponding to said predefined events and executing the operations defined therein; and
said system requesting action by said application tool when required by the operations contained in said objects.

23. A method for encapsulating an application tool as defined in claim 22 wherein the step of responding to said predefined events includes the step of matching a received event to patterns stored in said data structures to identify an event corresponding to the received event.

24. A method for encapsulating an application tool as defined in claim 23 wherein the step of responding to said predefined events further includes the step of evaluating and executing an operation contained in the stored event that matches the received event.

25. A method for encapsulating an application tool as defined in claim 22 further including the step of said system responding to system events received from said operating system by evaluating portions of said objects corresponding to said system events.

26. A method for encapsulating an application tool as defined in claim 22 wherein the step of requesting action by said application tool includes the steps of;
determining whether the application tool is to be executed locally or on a remote host computer, when the application tool is to be executed locally, forwarding a request directly to the application tool, and when the application tool is to be executed on a remote host computer, forwarding a request to the remote host computer.

27. A method for encapsulating an application tool as defined in claim 22 further including the step of said system responding to predefined notifications received from the development tools by triggering predefined operations that are defined in said objects.

28. A method for encapsulating a computer software application tool into a computer-aided software development system so that the encapsulated application tool functions in said software development system, said software development system including an electronic digital computer and computer software for operating said computer, said computer software comprising a user interface, an operating system and one or more software development tools for performing predefined software development tasks, said method comprising the steps of:

said system converting an interface description file that defines predetermined operations in responding to notifications received from the development tools into a set of software data structures representing said operations;

said system responding to a predefined notification received from one of the development tools by associating the predefined notification with one of the data structures and evaluating the corresponding data structure; and said system executing an operation defined by the data structure.

29. Apparatus for encapsulating a computer software application tool into a computer-aided software development system so that the encapsulated application tool functions in said software development system, said software development system including computer software comprising a user interface, an operating system and one or more software development tools for performing predefined software development tasks, said apparatus comprising:

an electronic digital computer for operation with said computer software, including a central processing unit and a memory unit;

means for converting an interface description file that defines predetermined operations in responding to predefined events received from the development tools and from the user interface into a set of software data structures for representing said operations;

means for responding to said predefined events received from the development tools and from the user interface by evaluating portions of said data structures corresponding to said predefined events and executing the operations defined in said data structures; and means for requesting action by said application tool when required by said portions of said data structures.

30. Apparatus for encapsulating an application tool as defined in claim 29 wherein said means for converting an interface description file includes means for compiling the interface description file to generate a symbol table defining the symbols in the interface description file and a statement table defining the operations in the interface description file.

31. Apparatus for encapsulating an application tool as defined in claim 30 wherein said means for converting an interface description file further includes means for evaluating said symbol table and said statement table to generate objects containing events defining operations which are performed when responding to said predefined events.

32. Apparatus for encapsulating an application tool as defined in claim 31 wherein said means for responding to said predefined events includes means for matching a received event to patterns stored in said data structures to identify an event corresponding to the received event.

33. Apparatus for encapsulating an application tool as defined in claim 32 wherein said means for responding to said predefined events further includes means for evaluating and executing an operation contained in the stored event that matches the received event.

34. Apparatus for encapsulating an application tool as defined in claim 29 further including means for responding to application events received from said application tool by evaluating portions of said data structures corresponding to said application events.

35. Apparatus for encapsulating an application tool as defined in claim 29 further including means for responding to system events received from said operating system by evaluating portions of said data structures corresponding to said system events.

36. Apparatus for encapsulating an application tool as defined in claim 29 wherein said means for requesting action by said application tool includes means for determining whether the application tool is to be executed locally or on a remote host computer, means for forwarding a request directly to the application tool when the application tool is to be executed locally, and means for forwarding a request to the remote host computer when the application tool is to be executed on the remote host computer.

37. Apparatus for encapsulating an application tool as defined in claim 29 further including means for responding to predefined notifications received from the development tools by triggering predefined operations that are defined in said data structures.

38. A method for encapsulating a computer software application tool into a computer system so that the encapsulated application tool functions in said computer system, said computer system including an electronic digital computer and computer software for operating said computer, said computer software comprising a user interface, an operating system and one or more standard software tools for performing predefined tasks, said method comprising the steps of:

said computer system converting an interface description file that defines predetermined operations in responding to predefined events into a set of software data structures representing said operations; and said computer system responding to predefined events by evaluating portions of said data structures that correspond to said predefined events and executing operations defined by said data structures.

39. A method for utilizing a computer software application tool in a computer system without modification of the application tool, said computer system including an electronic digital computer and computer software for operating said computer, said computer software comprising a user interface, an operating system and one or more standard software tools for performing predefined tasks, said method comprising the steps of:

said computer system converting an interface description file that defines predetermined operations in responding to predefined events received from the standard software tools and from the user interface into a set of software data structures for defining said operations; and said computer system responding to said predefined events received from the standard software tools and from the user interface by evaluating portions of said data structures corresponding to said predefined events and executing the operations specified by said portions of said data structures.

40. A method for providing a predetermined functionality in a computer-aided software development system including an electronic digital computer and computer software for operating said computer, said computer software comprising a user interface, an operating system and one or more software development tools for performing predefined software development tasks, said method comprising the steps of:

said system converting an interface description file that defines predetermined operations in responding to predefined events received from the development tools and from the user interface into a set of software data structures for defining said operations; and said system responding to said predefined events received from the development tools and from the user interface by evaluating portions of said data structures corresponding to said predefined events and executing the operations specified by said portions of said data structures.

* * * * *